United States Patent
Hosoyama

(10) Patent No.: US 10,889,233 B2
(45) Date of Patent: Jan. 12, 2021

(54) LIGHTING CONTROL DEVICE, VEHICULAR LAMP, AND LIGHTING CONTROL METHOD

(71) Applicant: STANLEY ELECTRIC CO., LTD., Tokyo (JP)

(72) Inventor: Yuki Hosoyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/421,517

(22) Filed: May 24, 2019

(65) Prior Publication Data

US 2019/0359122 A1 Nov. 28, 2019

(30) Foreign Application Priority Data

May 24, 2018 (JP) .................................. 2018-099805

(51) Int. Cl.
*B60Q 1/14* (2006.01)
*F21S 41/683* (2018.01)
(Continued)

(52) U.S. Cl.
CPC ......... *B60Q 1/1438* (2013.01); *B60Q 1/0029* (2013.01); *B60Q 1/085* (2013.01); *F21S 41/683* (2018.01)

(58) Field of Classification Search
CPC .... B60Q 1/1438; B60Q 1/0029; B60Q 1/085; F21S 41/683
(Continued)

(56) References Cited

U.S. PATENT DOCUMENTS 9,802,529 B2 * 10/2017 Herntrich ............... B60Q 1/085
2003/0107323 A1 * 6/2003 Stam ....................... F21S 41/62
315/82

(Continued)

FOREIGN PATENT DOCUMENTS

JP       2005-313805 A   11/2005
WO       2013/008085 A1   1/2013

OTHER PUBLICATIONS

Extended Search Report issued in European Application 19176298.8-1012 dated Oct. 28, 2019.

*Primary Examiner* — Bryon T Gyllstrom
(74) *Attorney, Agent, or Firm* — Xsensus LLP

(57) ABSTRACT

There are provided a lighting control device, a vehicular lamp, and a lighting control method which can prevent visibility in front of a driver of a vehicle from decreasing. The lighting control device controls a light distribution state by a vehicular headlamp, and includes: an obstacle detection part that detects an obstacle from an image in front of a subject vehicle taken by a camera; a light-shielding area deriving part that derives a first light-shielding area of a left headlamp attached to a front left side of the vehicle, and a second light-shielding area of a right headlamp attached to a front right side of the vehicle according to a position of the obstacle when the obstacle detection part detects the obstacle; and a light distribution control part that controls a light distribution state of the right headlamp and a light distribution state of the left headlamp according to the first light-shielding area and the second light-shielding area derived by the light-shielding area deriving part. The first light-shielding area and the second light-shielding area are different from each other.

12 Claims, 8 Drawing Sheets

(51) Int. Cl.
*B60Q 1/00* (2006.01)
*B60Q 1/08* (2006.01)

(58) Field of Classification Search
USPC .......................................................... 362/466
See application file for complete search history.

(56) References Cited

U.S. PATENT DOCUMENTS

| | | | |
|---|---|---|---|
| 2013/0242100 A1* | 9/2013 | Seki | B60Q 1/085 |
| | | | 348/148 |
| 2014/0145612 A1* | 5/2014 | Takagaki | B60Q 1/1423 |
| | | | 315/82 |
| 2015/0016128 A1* | 1/2015 | Doerne | B60Q 1/143 |
| | | | 362/465 |
| 2015/0062937 A1* | 3/2015 | Kasai | B60Q 1/143 |
| | | | 362/466 |
| 2016/0152174 A1* | 6/2016 | Hagisato | B60Q 1/143 |
| | | | 362/466 |
| 2016/0341391 A1* | 11/2016 | Yamamoto | B60Q 1/1438 |
| 2017/0028904 A1 | 2/2017 | Mizuno | |
| 2017/0067609 A1* | 3/2017 | Ichikawa | F21S 43/14 |
| 2017/0113599 A1* | 4/2017 | Park | F21S 41/285 |
| 2017/0158113 A1* | 6/2017 | Kanayama | B60Q 1/085 |
| 2017/0225611 A1* | 8/2017 | Kim | B60Q 1/085 |
| 2019/0202341 A1* | 7/2019 | Rikimaru | F21S 43/26 |

* cited by examiner

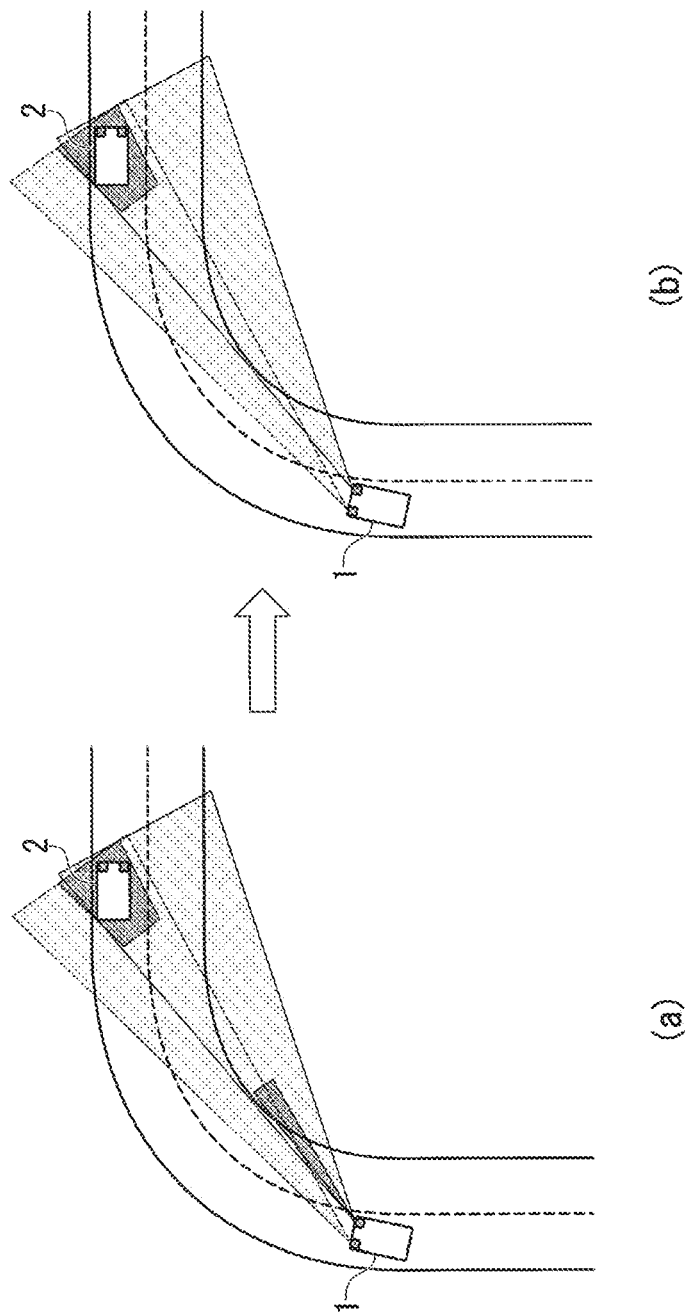

LIGHTING CONTROL DEVICE, VEHICULAR LAMP, AND LIGHTING CONTROL METHOD

This application claims the priority benefit under 35 U.S.C. § 119 of Japanese Patent Application No. 2018-099805 filed on May 24, 2018, which is hereby incorporated in its entirety by reference.

TECHNICAL FIELD

The present invention relates to a lighting control device, a vehicular lamp, and a lighting control method.

BACKGROUND ART

A headlamp for an automobile has, for example, two functions: a traveling beam (so-called high beam) and a passing beam (so-called low beam).

In recent years, ADBs (Adaptive Driving Beam) have been developed, and lamps having a function of ensuring an area to be irradiated with high beam by blocking a part of light where a preceding vehicle or an oncoming vehicle is assumed to exist in front of a vehicle have appeared.

In ADBs, cameras take pictures of the front of the vehicle, and when an object to which light is to be shielded (hereinafter, simply referred to as "to-be-shielded object" as appropriate) is detected, a signal is sent to an LCM (Light Control Module) to shield the object from light so that light does not reach the object.

Furthermore, there has been a known technique with respect to a vehicular headlamp for realizing a forward illumination without a sense of discomfort for a driver within a limited accuracy range when traveling on a crooked road, a curved road, or the like, for example, those disclosed in Japanese Patent Application Laid-Open No. 2005-313805.

A vehicular lighting device to which this technique is applied reads position data of a plurality of nodes positioned before and after a current vehicle position using the current vehicle position data and the road map database, and estimates the road shape by connecting the plurality of nodes by interpolation processing. Then, if a crooked road or a curved road exists on the course in the traveling direction of the vehicle, the road section on the course from the entrance point to the exit point of the vehicle is divided into a plurality of sections and the irradiation control of the vehicular headlamp is performed according to control contents corresponding to the respective sections.

According to this vehicular lighting device, if there is a to-be-shielded object on the course during traveling on a curved road, light-shielding control by read-ahead capability or the like can prevent glare from being projected to the object.

In the technique described above, when a to-be-shielded object and an obstacle exist in front of the vehicle, the obstacle may be shielded by shielding the to-be-shielded object from light depending on the positional relationship among the obstacle, the to-be-shielded object, and the light-shielding area of the right headlamp and the left headlamp of the vehicle. By shielding the obstacle from light, the driver of the vehicle is given a sense of discomfort and a decrease in visibility in front.

SUMMARY

The present invention was devised in view of these and other problems and features in association with the conventional art. An object according to an aspect of the present invention is to provide a lighting control device, a vehicular lamp, and a lighting control method which can prevent visibility in front of a driver of a vehicle from decreasing.

According to another aspect of the presently disclosed subject matter, there is provided a lighting control device configured to control a light distribution state by a vehicular headlamp, the lighting control device including: an obstacle detection part configured to detect an obstacle from an image in front of a subject vehicle taken by a camera; a light-shielding area deriving part configured to derive a first light-shielding area of a left headlamp attached to a front left side of the vehicle, and a second light-shielding area of a right headlamp attached to a front right side of the vehicle according to a position of the obstacle when the obstacle detection part detects the obstacle; and a light distribution control part configured to control a light distribution state of the right headlamp and a light distribution state of the left headlamp according to the first light-shielding area and the second light-shielding area derived by the light-shielding area deriving part, in which the first light-shielding area and the second light-shielding area are different from each other.

In one aspect of the present invention, the lighting control device with the foregoing aspect may be configured such that, when a counterclockwise direction is assumed as a positive angle with reference to the traveling direction of the subject vehicle, the light-shielding area deriving part derives a left headlamp left angle formed by the traveling direction of the subject vehicle and a line connecting the left headlamp and the left end of a preceding vehicle, a left headlamp right angle formed by the traveling direction of the subject vehicle and a line connecting the left headlamp and the right end of the preceding vehicle, and a left headlamp first angle formed by the traveling direction of the subject vehicle and a line connecting the left headlamp and the obstacle, and derives the first light-shielding area on the basis of the left headlamp left angle, the left headlamp right angle, and the left headlamp first angle.

In one aspect of the present invention, the lighting control device with the foregoing aspect may be configured such that the light-shielding area deriving part sets, when the left headlamp first angle is negative and is greater than the left headlamp right angle and less than the left headlamp left angle, a light-shielding area obtained in an angle range between the left headlamp first angle and the left headlamp left angle as the first light-shielding area, and sets, when the left headlamp first angle is positive and is greater than the left headlamp right angle and less than the left headlamp left angle, a light-shielding area obtained in an angle range between the left headlamp right angle and the left headlamp first angle as the first light-shielding area.

In one aspect of the present invention, the lighting control device with the foregoing aspect may be configured such that the light-shielding area deriving part sets, when the left headlamp first angle is negative and is less than the left headlamp right angle, a light-shielding area obtained in an angle range between the left headlamp left angle and the left headlamp right angle as the first light-shielding area, and sets, when the left headlamp first angle is positive and is greater than the left headlamp left angle, a light-shielding area obtained in an angle range between the left headlamp right angle and the left headlamp left angle as the first light-shielding area.

In one aspect of the present invention, the lighting control device with the foregoing aspect may be configured such that, when a counterclockwise direction is assumed as a positive angle with reference to the traveling direction of the subject vehicle, the light-shielding area deriving part derives a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and derives the second light-shielding area on the basis of the right headlamp left angle, the right headlamp right angle, and the right headlamp first angle.

In one aspect of the present invention, the lighting control device with the foregoing aspect may be configured such that the light-shielding area deriving part sets, when the right headlamp first angle is negative and is greater than the right headlamp right angle and less than the right headlamp left angle, a light-shielding area obtained in an angle range between the right headlamp first angle and the right headlamp left angle as the second light-shielding area, and sets, when the right headlamp first angle is positive and is greater than the right headlamp right angle and less than the right headlamp left angle, a light-shielding area obtained in an angle range between the right headlamp right angle and the right headlamp first angle as the second light-shielding area.

In one aspect of the present invention, the lighting control device with the foregoing aspect may be configured such that the light-shielding area deriving part sets, when the right headlamp first angle is negative and is less than the right headlamp right angle, a light-shielding area obtained in an angle range between the right headlamp left angle and the right headlamp right angle as the second light-shielding area, and sets, when the right headlamp first angle is positive and is greater than the right headlamp left angle, a light-shielding area obtained in an angle range between the right headlamp right angle and the right headlamp left angle as the second light-shielding area.

According to another aspect of the presently disclosed subject matter, there is provided a vehicular lamp comprising: a vehicular headlamp; and a lighting control device configured to control a light distribution state formed by the vehicular headlamp, wherein the lighting control device comprises: an obstacle detection part configured to detect an obstacle from an image in front of a subject vehicle taken by a camera; a light-shielding area deriving part configured to derive a first light-shielding area of a left headlamp attached to a front left side of the vehicle, and a second light-shielding area of a right headlamp attached to a front right side of the vehicle according to a position of the obstacle when the obstacle detection part detects the obstacle; and a light distribution control part configured to control a light distribution state of the right headlamp and a light distribution state of the left headlamp according to the first light-shielding area and the second light-shielding area derived by the light-shielding area deriving part, in which the first light-shielding area and the second light-shielding area are different from each other.

According to another aspect of the presently disclosed subject matter, there is provided a vehicular lamp comprising: a vehicular headlamp; and a lighting control device configured to control a light distribution state formed by the vehicular headlamp, wherein light is irradiated in an angle range in which an obstacle exists between the vehicular headlamp and a to-be-shielded object among angle ranges of the vehicular headlamp toward the to-be-shielded object within a light distribution range of the vehicular headlamp, and light is shielded in an angle range in which an obstacle does not exist between the vehicular headlamp and the to-be-shielded object.

According to another aspect of the presently disclosed subject matter, there is provided a lighting control method executed by a lighting control device configured to control a light distribution state by a vehicular headlamp, the lighting control method including: a step of detecting an obstacle from an image in front of a subject vehicle taken by a camera; a step of deriving a first light-shielding area of a left headlamp attached to a front left side of the vehicle, and a second light-shielding area of a right headlamp attached to a front right side of the vehicle according to a position of the obstacle when the obstacle is detected in the step of detecting an obstacle; and a step of controlling a light distribution state of the right headlamp and a light distribution state of the left headlamp according to the first light-shielding area and the second light-shielding area derived in the step of deriving, in which the first light-shielding area and the second light-shielding area are different from each other.

According to the present invention, there can be provided a lighting control device, a vehicular lamp, and a lighting control method which can prevent visibility in front of a driver of a vehicle from decreasing.

BRIEF DESCRIPTION OF DRAWINGS

These and other characteristics, features, and advantages of the present invention will become clear from the following description with reference to the accompanying drawings, wherein:

FIG. 8 is a diagram showing an effect of a lighting system provided in an automobile according to an exemplary embodiment of the present invention.

DESCRIPTION OF EXEMPLARY EMBODIMENTS

Figure 1:
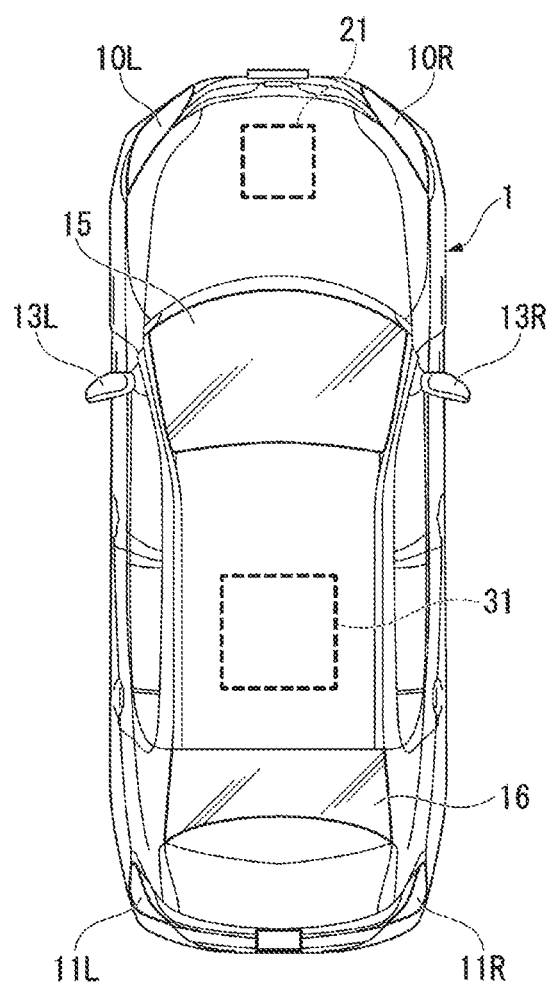
FIG. 1 is a diagram showing a schematic configuration of an automobile according to an exemplary embodiment of the present invention.

A description will now be made below to a lighting control device, a vehicular lamp, and a lighting control method according to the present exemplary embodiment with reference to the accompanying drawings in accordance with exemplary embodiments. The exemplary embodiments described below are merely an example, and exemplary embodiments to which the present invention is applied are not limited to the following exemplary embodiments.

In all the drawings for explaining the exemplary embodiments, the same reference numerals are used to denote the component having the same functions, and a repetitive description thereof is omitted.

The term "on the basis of (based on) XX" as used herein means "at least on the basis of (based on) XX" and includes the case where an object is based on another element in addition to XX. The term "on the basis of (based on) XX" is not limited to the case where XX is directly used, and includes the case where calculation or processing is performed on XX. "XX" is an arbitrary element, for example, any information. Further, the term "derive" used herein means to include calculation, computation or the like meaning.

Exemplary embodiments of the present invention will be described below with reference to the drawings.

EXEMPLARY EMBODIMENTS

A lighting control device according to this exemplary embodiment may be mounted on a vehicle. In the present exemplary embodiment, an automobile is illustrated as an example of the vehicle, but a motorcycle, a bicycle, an ultra-small mobility, a personal mobility, and the like are also available as vehicles.

General Configuration of Automobile:

FIG. 1 is a diagram showing a schematic configuration of an automobile according to an exemplary embodiment of the present invention.

The automobile 1 includes a left headlamp (referred to as a left headlamp part 10L in the present exemplary embodiment), a right headlamp (referred to as a right headlamp part 10R in the present exemplary embodiment), a left taillamp (referred to as a left taillamp part 11L in the present exemplary embodiment), a right taillamp (referred to as a right taillamp part 11R in the present exemplary embodiment), a left side mirror (referred to as a left side mirror 13L in the present exemplary embodiment), a right side mirror (referred to as a right side mirror 13R in the present exemplary embodiment), a front window 15, and a rear window 16.

The left headlamp part 10L is disposed on the left side of the front of the automobile 1, and the right headlamp part 10R is disposed on the right side of the front of the automobile 1.

The left taillamp part 11L is disposed on the left side of the rear of the automobile 1, and the right taillamp part 11R is disposed on the right side of the rear of the automobile 1.

Further, the automobile 1 includes a front vehicle outside detection part (referred to as a front vehicle outside detection part 21 in the present exemplary embodiment) and a control part 31.

Here, in the present exemplary embodiment, part of the constituent parts of the automobile 1 is shown, but in addition thereto, for example, an arbitrary constituent part such as another constituent part to be usually provided in a general automobile may be provided.

In addition, part of or all of the front vehicle outside detection part 21 and the control part 31 may be provided inside the automobile 1 without being seen in the outer appearance of the automobile 1.

Figure 2:
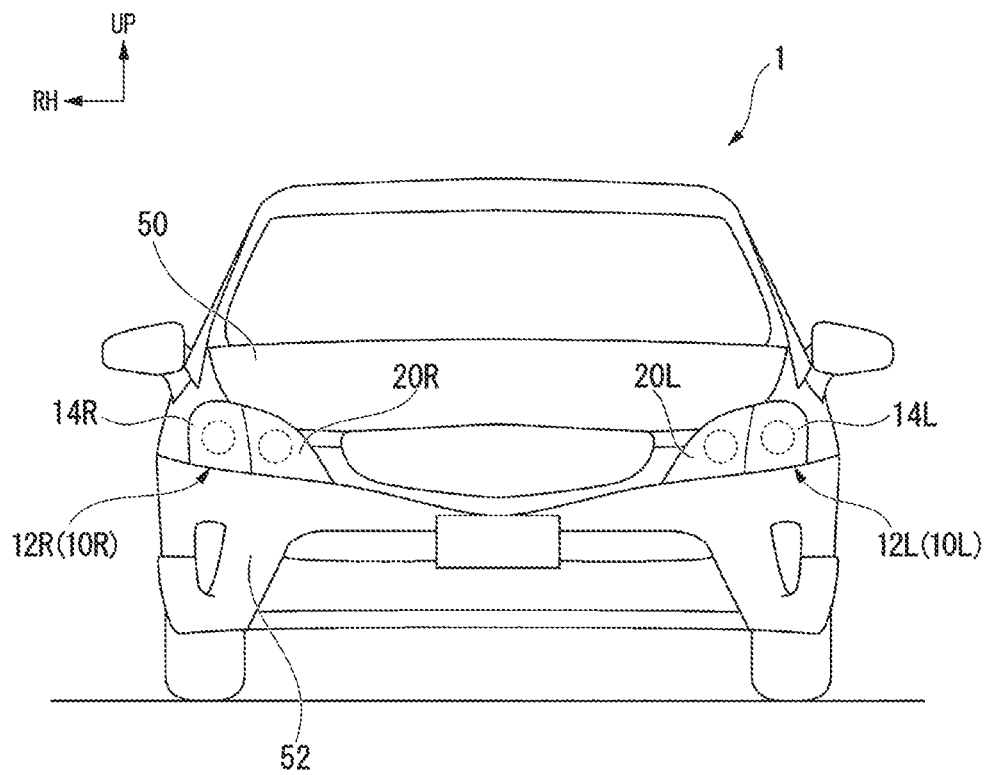
FIG. 2 is a view showing a front portion of an automobile to which a lighting system according to an exemplary embodiment of the present invention is applied.

FIG. 2 is a diagram showing a front portion of an automobile to which a lighting system according to an exemplary embodiment of the present invention is applied.

As shown in FIG. 2, the left headlamp part 10L includes a left headlamp unit 12L and a left road-surface drawing part 20L. The left headlamp unit 12L is disposed at the left end of the front end portion of the automobile 1, and the left road-surface drawing part 20L is disposed on the right side of the left headlamp unit 12L.

The right headlamp part 10R includes a right headlamp unit 12R and a right road-surface drawing part 20R. The right headlamp unit 12R is disposed at the right end of the front end portion of the automobile 1, and the right road-surface drawing part 20R is disposed on the left side of the right headlamp unit 12R.

A front end portion of a hood 50 for opening and closing the engine room of the automobile 1 is disposed above the left headlamp unit 12L and the right headlamp unit 12R. The lower portions of the left road-surface drawing part 20L and the right road-surface drawing part 20R are covered from the front side by a bumper cover 52 constituting the front end portion of the automobile 1. The headlamp unit 12R and the headlamp unit 12L are configured to be bilaterally symmetrical in the vehicle width direction.

The left headlamp unit 12L includes a left headlamp 14L constituting an outer portion of the left headlamp unit 12L in the vehicle width direction, and the left road-surface drawing part 20L constituting an inner portion of the left headlamp unit 12L in the vehicle width direction.

The right headlamp unit 12R includes a right headlamp 14R constituting an outer portion of the right headlamp unit 12R in the vehicle width direction, and the right road-surface drawing part 20R constituting an inner portion of the right headlamp unit 12R in the vehicle width direction.

The left headlamp 14L and the right headlamp 14R each have a light source (not shown), and emit light toward the front of the automobile 1. The light source is configured as a light source for a low beam and a high beam. In other words, the left headlamp 14L and the right headlamp 14R are mainly configured to be switchable to either a low beam for irradiating a road surface area (low beam light distribution area) in front of the automobile 1 or a high beam for irradiating an upper area (high beam light distribution area) above the area irradiated by the low beam. As the light sources of the left headlamp 14L and the right headlamp 14R, an LED (Light Emitting Diode), a halogen lamp, a discharge lamp, a laser, or the like may be adopted.

Figure 3:
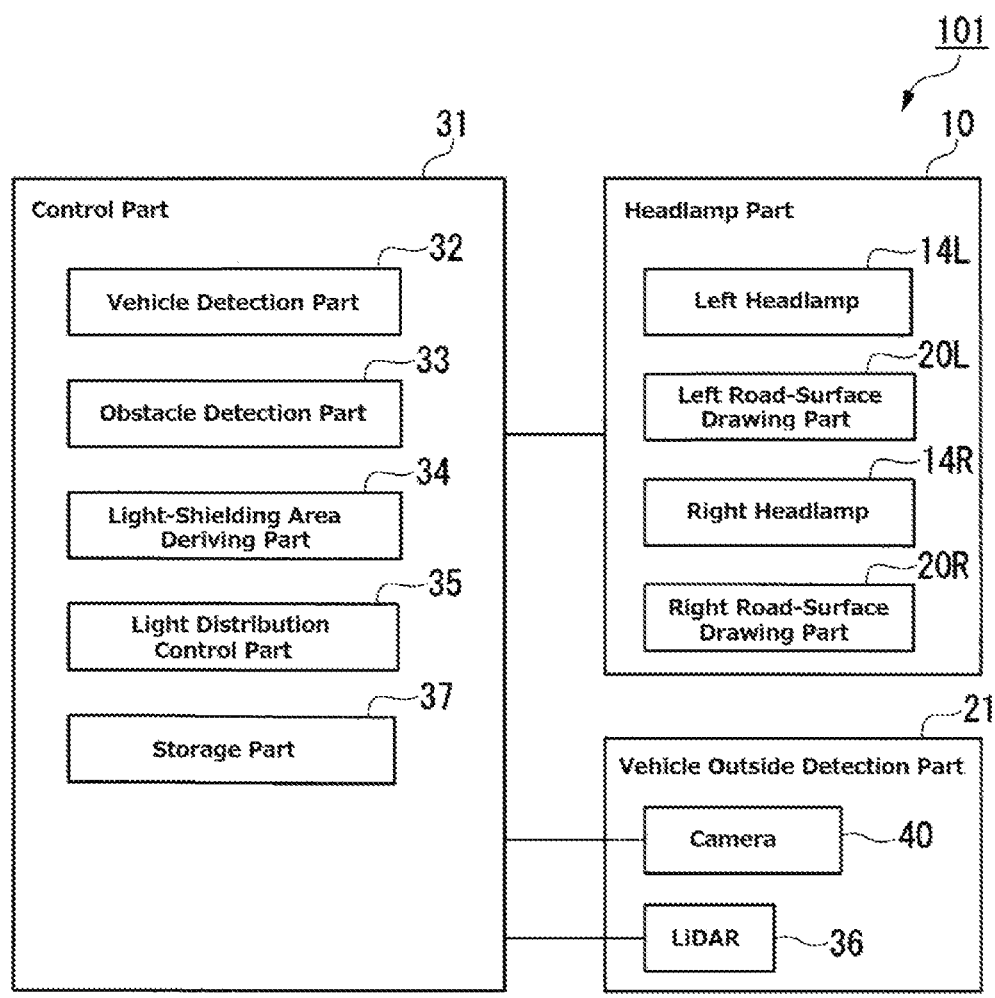
FIG. 3 is a functional block diagram showing a schematic functional configuration of a lighting system provided in an automobile according to an exemplary embodiment of the present invention.

Schematic functional configuration of automobile control system:

FIG. 3 is a functional block diagram showing a schematic functional configuration of a lighting system provided in an automobile according to an exemplary embodiment of the present invention.

The lighting system 101 includes a headlamp part 10, a control part 31, and a front vehicle outside detection part 21. Among the headlamp part 10, the control part 31, and the front vehicle outside detection part 21 included in the lighting system 101, the headlamp part 10 and the control part 31 constitute a vehicular lamp.

Here, in the present exemplary embodiment, similarly to the general concept of "front and rear", the direction in which the driver of the automobile 1 faces in the normal state and in which the automobile 1 travels (runs) in the normal state is defined as "front (forward)", and the opposite direction thereto is defined as "rear (rearward)".

The headlamp part 10 is a so-called headlamp, and irradiates light to the front of the automobile 1.

The left road-surface drawing part 20L mainly irradiates the left side in front of the automobile 1 with light. The left road-surface drawing part 20L projects light with a predetermined light distribution pattern.

The right road-surface drawing part 20R mainly irradiates the right side in front of the automobile 1 with light. The right road-surface drawing part 20R projects light with a predetermined light distribution pattern.

The left headlamp 14L mainly irradiates the left side in front of the automobile 1 with light. The left headlamp 14L has a function of irradiating light of a traveling beam (so-called high beam) and a function of irradiating light of a passing beam (so-called low beam), and these two functions can be switched to one another.

The right headlamp 14R mainly irradiates the right side in front of the automobile 1 with light. The right headlamp 14R has a function of irradiating light of a traveling beam (so-called high beam) and a function of irradiating light of a passing beam (so-called low beam), and these two functions can be switched to one another.

As each of the left headlamp 14L, the right headlamp 14R, the left road-surface drawing part 20L, and the right road-surface drawing part 20R, an arbitrary lamp may be adopted. As a specific example, one or more of a lamp of a traveling beam, a lamp of a passing beam, a MEMS (Micro Electro Mechanical Systems) laser scanning headlamp, a DMD (Digital Mirror Device) headlamp, a matrix ADB headlamp capable of controlling columns and rows, or an ADB headlamp capable of controlling only columns may be used as the lamp. Herein, the MEMS laser scanning headlamp is, for example, an example of a vehicular headlamp capable of variably changing the light distribution, and is an example for a seamless ADB lamp.

The front vehicle outside detection part 21 detects information relating to the outside in front of the automobile 1. In the present exemplary embodiment, the automobile 1 is provided with the front vehicle outside detection part 21, but as another configuration example, a rear vehicle outside detection part may be provided.

As still another configuration example, the automobile 1 may include a vehicle outside detection part (also referred to as a "lateral vehicle outside detection part" in the present exemplary embodiment) that detects information on the side of the automobile 1. As the lateral vehicle outside detection part, for example, a lateral vehicle outside detection part on the right side with respect to the traveling direction of the automobile 1 and a lateral vehicle outside detection part on the left side with respect to the traveling direction of the automobile 1 may be used.

The front vehicle outside detection part 21 may include a detection part that detects arbitrary information relating to the front outside of the vehicle. The front vehicle outside detection part 21 may include, for example, one or more of a laser radar (LiDAR: Light Detection and Ranging) 36, a radar, a sonar, and a camera (imaging device) 40.

The camera 40 may have, for example, a function of detecting visible light, a function of detecting infrared light, or both. In the present exemplary embodiment, a case where the front vehicle outside detection part 21 includes the LiDAR 36 and the camera 40 will be described. The camera 40 is installed at a predetermined position of the automobile 1, for example, in the vicinity of an indoor mirror, and photographs a space in front of the automobile 1.

The LiDAR 36 is a sensor which is installed at a predetermined position of the automobile 1, for example, in the vicinity of an indoor mirror, irradiates an infrared pulsed laser beam to measure a distance on the basis of a time until the infrared laser beam is reflected by an object and comes back.

Similarly, in the case where a rear vehicle outside detection part is provided, a detection part for detecting arbitrary information on the rear outside of the vehicle may be provided.

Similarly, in the case where a lateral vehicle outside detection part is provided, the lateral vehicle outside detection part may include a detection part for detecting arbitrary information on the lateral outside of the vehicle.

The control part 31 includes a vehicle detection part 32, an obstacle detection part 33, a light-shielding area deriving part 34, a light distribution control part 35, and a storage part 37.

The storage part 37 stores information. Herein, the storage part 37 may store arbitrary information. As an example, the storage part 37 may store information such as a control program or a control parameter to be executed or used by the control part 31. In this instance, the control part 31 includes, for example, a processor such as a CPU (Central Processing Unit), and executes various processes by executing control programs stored in the storage part 37 using control parameters stored in the storage part 37.

Note that all or part of the control part 31 may be realized by hardware such as an LSI (Large Scale Integration), an ASIC (Application Specific Integrated Circuit, or a FPGA (Field-Programmable Gate Array), or may be realized by combining a software function unit and hardware.

The vehicle detection part 32 acquires images of the front of the automobile 1 periodically photographed by the camera 40, and detects a front vehicle such as a preceding vehicle or an oncoming vehicle on the basis of the acquired images of the front of the automobile 1. Specifically, the vehicle detection part 32 detects the preceding vehicle by recognizing a pair of points on the preceding vehicle by performing image recognition processing on the image. An example of the pair of points is the taillamp of the preceding vehicle, i.e., the left taillamp part 11L and the right taillamp part 11R. The vehicle detection part 32 detects the oncoming vehicle by recognizing a pair of points on the oncoming vehicle by performing image recognition processing on the image. An example of a pair of points is a headlamp of an oncoming vehicle (left headlamp 14L and right headlamp 14R).

When the preceding vehicle is detected, the vehicle detection part 32 outputs a pair of recognition results on the preceding vehicle to the light-shielding area deriving part 34. Here, an example of a pair of recognition results on the preceding vehicle is a pair of images on the preceding vehicle. When detecting an oncoming vehicle, the vehicle detection part 32 outputs a pair of recognition results on the oncoming vehicle to the light-shielding area deriving part 34. Here, an example of the pair of recognition results on the oncoming vehicle is a pair of images on the oncoming vehicle.

Hereinafter, a case where the vehicle detection part 32 detects a preceding vehicle will be described as an example.

The obstacle detection part 33 acquires an image in front of the automobile 1 periodically photographed by the camera 40, and detects the obstacle on the basis of the acquired image in front of the automobile 1. Examples of obstacles are guard rails, walls, e.g. cliffs, buildings, etc. More specifically, the storage part 37 stores the feature amount of the obstacle in advance. The obstacle detection part 33 performs image recognition processing on the image in front of the automobile 1, and determines whether or not the feature amount of the obstacle stored in the storage part 37 is included on the basis of the result of the image recognition processing. When it is determined that an obstacle is included in the image in front of the automobile 1, the obstacle detection part 33 outputs the recognition result of one point on the obstacle to the light-shielding area deriving part 34. Here, an example of the recognition result of one point on the obstacle is an image of one point of the edge portion on the obstacle. Hereinafter, the case where the obstacle is a wall WL will be described. In this case, the obstacle detection part 33 outputs the recognition result of one point on the boundary between the wall WL and a portion other than the wall WL to the light-shielding area deriving part 34.

The light-shielding area deriving part 34 obtains the positional relationship between the automobile 1 and the preceding vehicle on the basis of the pair of recognition results on the preceding vehicle output from the vehicle detection part 32, and derives light shielding areas of the headlamp part 10 (the left headlamp 14L, the right headlamp 14R, the left road-surface drawing part 20L, and the right road-surface drawing part 20R) on the basis of the obtained positional relationship.

In addition, the light-shielding area deriving part 34 derives an area that is not shielded from light (hereinafter referred to as a "non-shielded region") out of the light-shielding areas derived on the basis of the pair of recognition results on the preceding vehicle. For example, if the preceding vehicle is shielded from light according to the derived light-shielding area when the vehicle reaches a curve during driving, the obstacle may also be shielded from light. As a result of shielding the obstacle from light, the driver of the automobile 1 cannot see the obstacle, meaning that the visibility in front is lowered. The light-shielding area deriving part 34 makes the driver of the automobile 1 see the obstacle by making the part of the light-shielding area where the obstacle exists as the non-light-shielding area.

The non-light-shielding area is different between the right headlamp part 10R and the left headlamp part 10L. Therefore, hereinafter, the non-light-shielding area of the right headlamp part 10R is referred to as a right headlamp non-light-shielding area RNSR, and the non-light-shielding area of the left headlamp part 10L is referred to as a left headlamp non-light-shielding area LNSR.

The process by which the light-shielding area deriving part 34 derives the non-light-shielding area will be described separately for the right headlamp part 10R and for the left headlamp part 10L.

Figure 4:
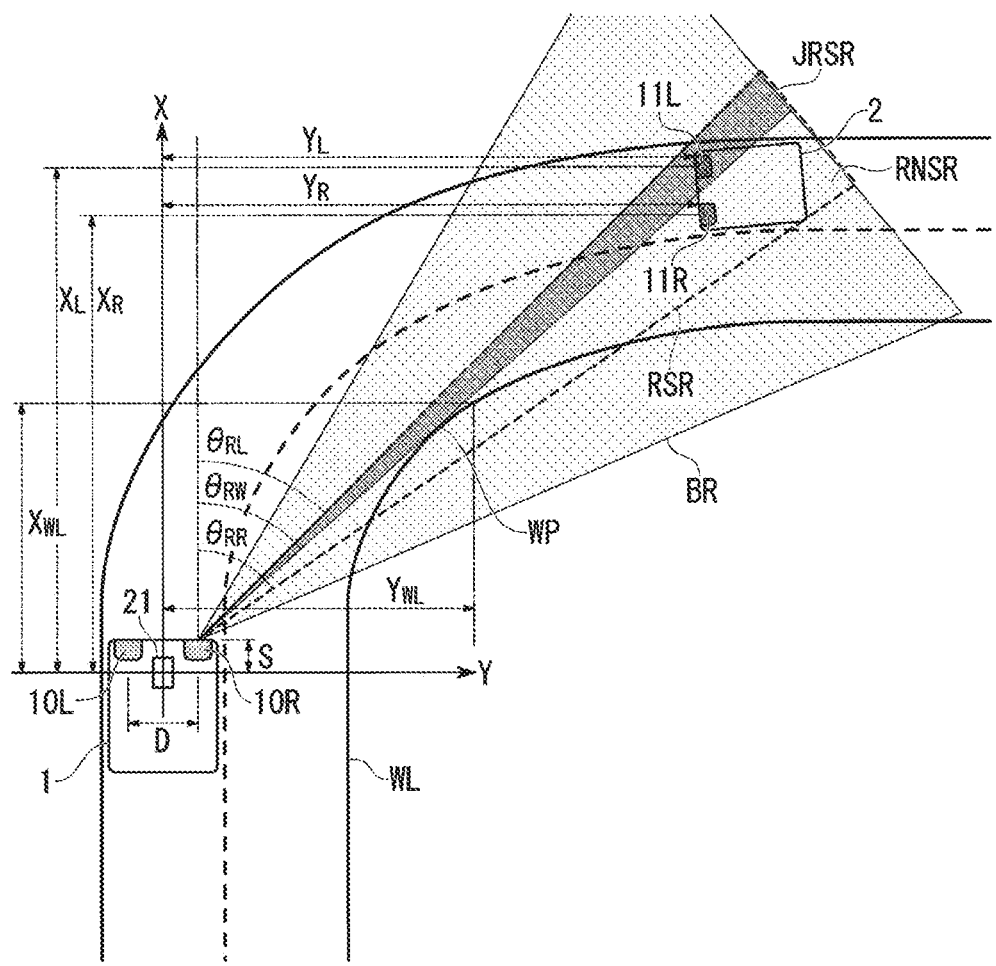
FIG. 4 is a diagram showing an example (Part 1) of processing of a vehicular lamp lighting system provided in an automobile according to an exemplary embodiment of the present invention.

Right headlamp part 10R:

FIG. 4 is a diagram showing an example of processing (part 1) of a lighting system provided in an automobile according to an exemplary embodiment of the present invention.

FIG. 4 shows a case where the automobile 1 detects the preceding vehicle 2, derives the right headlamp light-shielding area RSR which is the light-shielding area of the right headlamp part 10R on the basis of the detected pair of recognition results on the preceding vehicle 2, and reaches the right curve in a state where the preceding vehicle 2 is shielded from light by the derived right headlamp light-shielding area RSR.

FIG. 4 shows the right headlamp light-shielding area RSR derived on the basis of a pair of recognition results on the preceding vehicle 2, and a beam BR (low beam or high beam) irradiated by the right headlamp part 10R. The light-shielding area deriving part 34 derives an area corresponding to the wall WL from the right headlamp light-shielding area RSR. The light-shielding area deriving part 34 sets an area corresponding to the derived wall WL as the right headlamp non-light-shielding area RNSR, and excludes the right headlamp non-light-shielding area RNSR from the right headlamp light-shielding area RSR. That is, the light-shielding area deriving part 34 set an area excluding the right headlamp non-light-shielding area RNSR from the right headlamp light-shielding area RSR as an area actually shielded. Hereinafter, the area obtained by excluding the right headlamp non-light-shielding area RNSR from the right headlamp light-shielding area RSR is referred to as an actual right headlamp light-shielding area JRSR.

Figure 5:
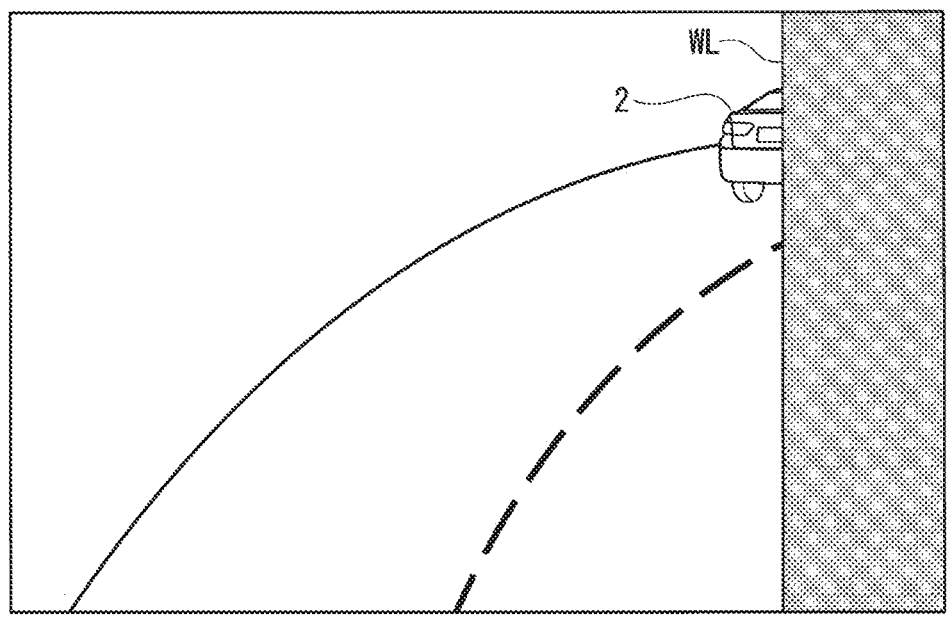
FIG. 5 is a view showing an example of an image in front of an automobile.

FIG. 5 is a diagram showing an example of an image in front of the automobile 1. The example illustrated in FIG. 5 is an example of an image obtained when the automobile 1 reaches a right curve while traveling, and a part of the preceding vehicle 2 is not visible behind the wall WL. From the front vehicle outside detection part 21 of the automobile 1, the right taillamp part 11R of the preceding vehicle 2 cannot be seen while hidden by the wall WL, and the left taillamp part 11L can be seen. In this case, the light-shielding area deriving part 34 sets an obstacle as an area where light is irradiated, and sets a portion of the left taillamp part 11L of the preceding vehicle 2 as an area where light is to be blocked. Returning to FIG. 4, a description will be continued.

Herein, in the automobile 1, the position of the indoor mirror to which the front vehicle outside detection part 21 is attached is taken as the origin. The front-rear direction of the automobile 1 is defined as the X-axis, and the traveling direction of the automobile 1 is defined as the positive direction. Further, it is assumed that the Y-axis is the left-right direction of the automobile 1 perpendicular to the X-axis and, and the positive direction thereof is the right direction of the automobile 1. In addition, the traveling direction of the automobile 1 is set as a reference, and the counterclockwise direction is set as a positive angle.

In the preceding vehicle 2, the coordinates of the position of the left end portion are defined as $(X_L, Y_L)$, and the coordinates of the position of the right end portion are defined as $(X_R, Y_R)$. Here, an example of the left side end portion is the left taillamp part 11L, and an example of the right side end portion is the right taillamp part 11R. In the present exemplary embodiment, a description will be continued assuming that the left end portion is the left taillamp part 11L and the right end portion is the right taillamp part 11R. The coordinate of the position of the point WP on the obstacle WP is defined as $(X_{WL}, Y_{WL})$. In the automobile 1, the distance between the left headlamp part 10L and the right headlamp part 10R, i.e., the length in the Y-axis direction, is defined as D, and the length in the X-axis direction between the headlamp part 10 and the front vehicle outside detection part 21 is defined as S.

The light-shielding area deriving part 34 acquires images of the front of the automobile 1 periodically photographed by the camera 40, and detects the preceding vehicle 2 and the wall WL on the basis of the acquired images of the front of the automobile 1. The light-shielding area deriving part 34 causes the LiDAR 36 to derive the distance between the LiDAR 36 and the left taillamp part 11L of the preceding vehicle 2, the distance between the LiDAR 36 and the right taillamp part 11R of the preceding vehicle 2, and the distance between the LiDAR 36 and the wall WL (a point on the border between the wall WL and a portion other than the wall WL).

The light-shielding area deriving part 34 acquires the distance derived by the LiDAR 36 between the LiDAR 36 and the left taillamp part 11L of the preceding vehicle 2, and derives the coordinate $(X_L, Y_L)$ of the position of the left end portion (in the present exemplary embodiment, the left taillamp part 11L) on the basis of the acquired distance between the LiDAR 36 and the left taillamp part 11L of the preceding vehicle 2.

The light-shielding area deriving part 34 acquires the distance derived by the LiDAR 36 between the LiDAR 36 and the right taillamp part 11R of the preceding vehicle 2, and derives the coordinate ($X_R$, $Y_R$) of the position of the right end portion (in the present exemplary embodiment, the right taillamp part 11R) on the basis of the acquired distance between the LiDAR 36 and the right taillamp part 11R of the preceding vehicle 2.

The light-shielding area deriving part 34 acquires the distance derived by the LiDAR 36 between the LiDAR 36 and the wall WL (one point on the boundary between the wall WL and a portion other than the wall WL), and derives the coordinate ($X_{WL}$, $Y_{WL}$) of one point on the wall WL on the basis of the acquired distance between the LiDAR 36 and the wall WL (one point on the boundary between the wall WL and a portion other than the wall WL).

The light-shielding area deriving part 34 derives an angle (hereinafter, referred to as a "right headlamp left angle $\theta_{RL}$") formed by the traveling direction of the automobile 1 and a line connecting the right headlamp part 10R of the automobile 1 and the left end portion of the preceding vehicle 2. More specifically, the light-shielding area deriving part 34 derives the right headlamp left angle $\theta_{RL}$ by Equation (1).

$$\theta_{RL} = a\tan\left[\{Y_L-(D/2)\}/\{X_L-S\}\right]+\theta_{ML1} \quad (1)$$

In Equation (1), $\theta_{ML1}$ is a margin of the right headlamp left angle $\theta_{RL}$. The value of $\theta_{ML1}$ changes with the distance between the automobile 1 and the preceding vehicle 2.

Further, the light-shielding area deriving part 34 derives an angle (hereinafter referred to as "right headlamp right angle $\theta_{RR}$") formed by the traveling direction of the automobile 1 and a line connecting the right headlamp part 10R of the automobile 1 and the right end portion of the preceding vehicle 2. Specifically, the light-shielding area deriving part 34 derives the right headlamp right angle $\theta_{RR}$ by Equation (2).

$$\theta_{RR} = a\tan\left[\{Y_R-(D/2)\}/\{X_R-S\}\right]+\theta_{ML2} \quad (2)$$

In Equation (2), $\theta_{ML2}$ is a margin of the left headlamp right angle $\theta RR$. The value of $\theta_{ML2}$ changes with the distance between the automobile 1 and the preceding vehicle 2. The $\theta_{ML1}$ and the $\theta_{ML2}$ may have the same value or different values.

The light-shielding area deriving part 34 derives an angle (hereinafter referred to as the "right headlamp first angle $\theta_{RW}$") formed by the traveling direction of the automobile 1 and a line connecting the right headlamp 10R of the automobile 1 and the wall WL. Specifically, the light-shielding area deriving part 34 derives the right headlamp first angle $\theta_{RW}$ by Equation (3).

$$\theta_{RW} = a\tan\left[\{Y_{WL}-(D/2)\}/\{X_{WL}-S\}\right] \quad (3)$$

The light-shielding area deriving part 34 determines the magnitude relation among the right headlamp left angle $\theta_{RL}$, the right headlamp right angle $\theta_{RR}$, and the right headlamp first angle $\theta_{RW}$ on the basis of the derived right headlamp left angle $\theta_{RL}$, right headlamp right angle $\theta_{RR}$, and right headlamp first angle $\theta_{RW}$.

When the right headlamp first angle $\theta_{RW}$ is negative and is larger than the right headlamp right angle $\theta_{RR}$ and smaller than the right headlamp left angle $\theta_{RL}$, the light-shielding area deriving part 34 sets a light-shielding area obtained in an angle range between the right headlamp first angle $\theta_{RW}$ and the right headlamp left angle $\theta_{RL}$ as the actual right headlamp light-shielding area JRSR.

Herein, instead of using the light-shielding area obtained in the angle range between the right headlamp first angle $\theta_{RW}$ and the right headlamp left angle $\theta_{RL}$ as the actual right headlamp light-shielding area JRSR, the light-shielding area deriving part 34 may adopt as the actual right headlamp light-shielding area JRSR the light-shielding area obtained in the angle range between the right headlamp left angle $\theta_{RL}$ and an angle obtained by adding the attachment angle error $\theta_s$ of the front vehicle outside detection part 21 to the right headlamp first angle $\theta_{RW}$.

Here, the attachment angle error $\theta_s$ of the front vehicle outside detection part 21 may be either positive or negative, and is set so that the actual right headlamp light-shielding area JRSR is widened. With such a configuration, even if the attachment position of the front vehicle outside detection part 21 is shifted, the actual right headlamp light-shielding area JRSR is set to be widened, and therefore, it is possible to prevent glare from being given to the preceding vehicle 2.

When the right headlamp first angle $\theta_{RW}$ is positive, and when the right headlamp first angle $\theta_{RW}$ is larger than the right headlamp right angle $\theta_{RR}$ and smaller than the right headlamp left angle $\theta_{RL}$, the light-shielding area deriving part 34 sets the light-shielding area obtained in the angle range between the right headlamp right angle $\theta_{RR}$ and the right headlamp first angle $\theta_{RW}$ as the actual right headlamp light-shielding area JRSR.

Here, instead of using the light-shielding area obtained in the angle range between the right headlamp right angle $\theta_{RR}$ and the right headlamp first angle $\theta_{RW}$ as the actual right headlamp light-shielding area JRSR, the light-shielding area deriving part 34 may adopt as the actual right headlamp light-shielding area JRSR the light-shielding area obtained in the angle range between the right headlamp right angle $\theta_{RR}$ and an angle obtained by adding the attachment angle error $\theta_s$ of the front vehicle outside detection part 21 to the right headlamp first angle $\theta_{RW}$.

Here, the attachment angle error $\theta_s$ of the front vehicle outside detection part 21 may be either positive or negative, and is set so that the actual right headlamp light-shielding area JRSR is widened. With such a configuration, even if the attachment position of the front vehicle outside detection part 21 is shifted, the actual right headlamp light-shielding area JRSR is set to be widened, and therefore, it is possible to prevent glare from being given to the preceding vehicle 2.

Further, when the right headlamp first angle $\theta_{RW}$ is negative and is smaller than the right headlamp right angle $\theta_{RR}$, the light-shielding area deriving part 34 sets the light-shielding area obtained in the angle range between the right headlamp left angle $\theta_{RL}$ and the right headlamp right angle $\theta_{RR}$ as the actual right headlamp light-shielding area JRSR. This is the case where the obstacle is not shielded from light in the right headlamp light-shielding area RSR derived on the basis of the positional relationship between the automobile 1 and the preceding vehicle 2.

Further, when the right headlamp first angle $\theta_{RW}$ is positive and is larger than the right headlamp left angle $\theta_{RL}$, the light-shielding area deriving part 34 sets the light-shielding area obtained in the angle range between the right headlamp right angle $\theta_{RR}$ and the right headlamp left angle $\theta_{RL}$ as the actual right headlamp light-shielding area JRSR. This is the case where the obstacle is not shielded from light in the right headlamp light-shielding area RSR derived on the basis of the positional relationship between the automobile 1 and the preceding vehicle 2.

The light-shielding area deriving part 34 outputs information indicating an angle range in which the actual right headlamp light-shielding area JRSR is obtained (hereinafter referred to as "actual right headlamp angle range") to the light distribution control part 35.

Figure 6:
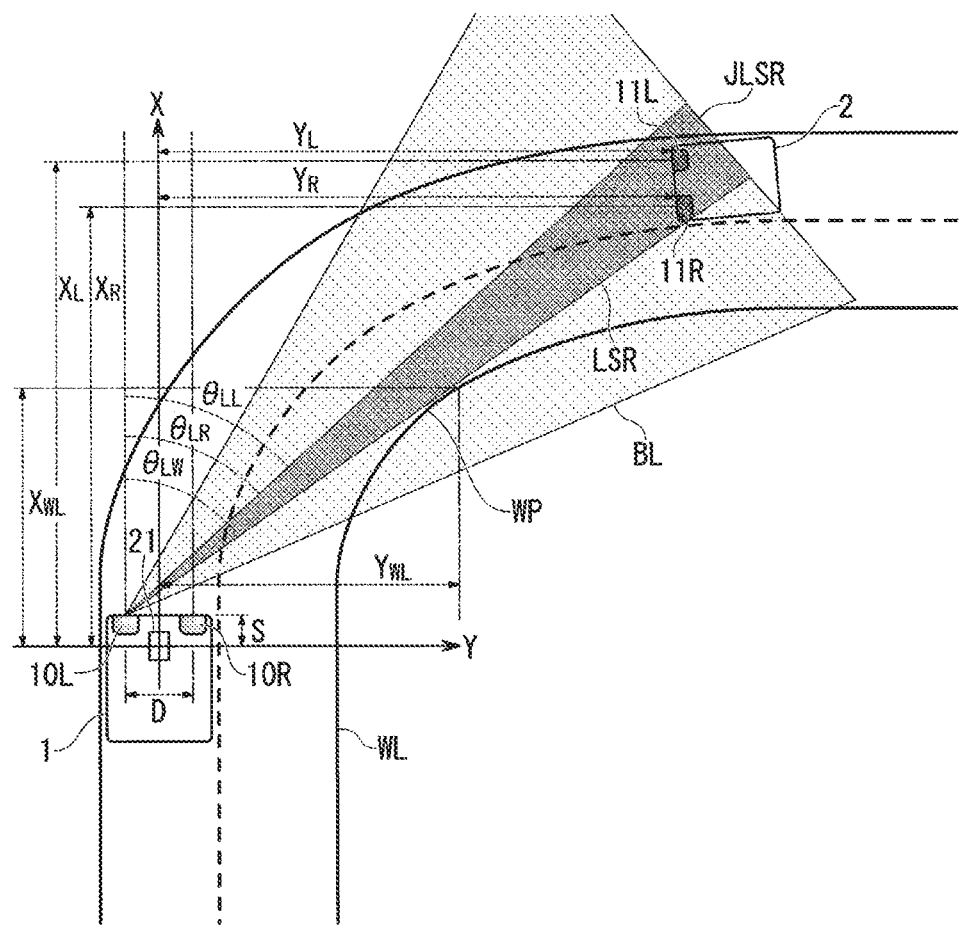
FIG. 6 is a diagram showing an example (part 2) of processing of a lighting system provided in an automobile according to an exemplary embodiment of the present invention.

Left Headlamp Part 10L:

FIG. 6 is a diagram showing an example (part 2) of processing of a lighting system provided in an automobile according to an exemplary embodiment of the present invention.

FIG. 6 shows a case where the automobile 1 detects the preceding vehicle 2 in FIG. 4, derives the left headlamp light-shielding area LSR which is the light-shielding area of the left headlamp part 10L on the basis of the detected pair of recognition results on the preceding vehicle 2, and reaches the right curve in a state where the preceding vehicle 2 is shielded from light by the derived left headlamp light-shielding area LSR.

FIG. 6 shows the left headlamp light-shielding area LSR derived on the basis of a pair of recognition results on the preceding vehicle 2, and a beam BL (low beam or high beam) irradiated by the left headlamp part 10L. The light-shielding area deriving part 34 derives an area corresponding to the wall WL, i.e., an area where the wall WL is shielded from light, in the left headlamp light-shielding area LSR. The light-shielding area deriving part 34 sets an area corresponding to the derived wall WL as the left headlamp non-light-shielding area LNSR, and excludes the left headlamp non-light-shielding area LNSR from the left headlamp light-shielding area LSR. Hereinafter, an area obtained by excluding the left headlamp non-light-shielding area LNSR from the left headlamp light-shielding area LSR is referred to as an actual left headlamp light-shielding area JLSR.

The light-shielding area deriving part 34 derives an angle (hereinafter referred to as "left headlamp left angle $\theta_{LL}$") formed by the traveling direction of the automobile 1 and a line connecting the left headlamp part 10L of the automobile 1 and the left end portion of the preceding vehicle 2. Specifically, the light-shielding area deriving part 34 derives the left headlamp left angle $\theta_{LL}$ by Equation (4).

$$\theta_{LL} = a\tan\left[\{Y_L + (D/2)\}/\{X_L - S\}\right] + \theta_{ML3} \quad (4)$$

In Equation (4), $\theta_{ML3}$ is the margin of the left headlamp left angle $\theta_{LL}$. The value of $\theta_{ML3}$ changes with the distance between the automobile 1 and the preceding vehicle 2. $\theta_{ML3}$ may be the same as one or both of $\theta_{ML1}$ and $\theta_{ML2}$.

Further, the light-shielding area deriving part 34 derives an angle (hereinafter, referred to as a "left headlamp right angle $\theta_{LR}$") formed by the traveling direction of the automobile 1 and a line connecting the left headlamp part 10L of the automobile 1 and the right end portion of the preceding vehicle 2. More specifically, the light-shielding area deriving part 34 derives the left headlamp right angle $\theta_{LR}$ by Equation (5).

$$\theta_{LR} = a\tan\left[\{Y_R + (D/2)\}/\{X_R - S\}\right] + \theta_{ML4} \quad (5)$$

In Equation (5), $\theta_{ML4}$ is the margin of the left headlamp right angle $\theta_{LR}$. The value of $\theta_{ML4}$ changes with the distance between the automobile 1 and the preceding vehicle 2. $\theta_{ML4}$ may be the same as at least one of $\theta_{ML1}$, $\theta_{ML2}$, and $\theta_{ML3}$.

Further, the light-shielding area deriving part 34 derives an angle (hereinafter referred to as a "left headlamp first angle $\theta_{LW}$") formed by the traveling direction of the automobile 1 and a line connecting the left headlamp part 10L of the automobile 1 and the wall WL. Specifically, the light-shielding area deriving part 34 derives the left headlamp first angle $\theta_{LW}$ by Equation (6).

$$\theta_{LW} = a\tan\left[\{Y_{WL} + (D/2)\}/\{X_{WL} - S\}\right] \quad (6)$$

The light-shielding area deriving part 34 determines the magnitude relation among the left headlamp left angle $\theta_{LL}$, the left headlamp right angle $\theta_{LR}$, and the left headlamp first angle $\theta_{LW}$ on the basis of the derived left headlamp left angle $\theta_{LL}$, the derived left headlamp right angle $\theta_{LR}$, and the derived left headlamp first angle $\theta_{LW}$.

When the left headlamp first angle $\theta_{LW}$ is negative, and is larger than the left headlamp right angle $\theta_{LR}$ and smaller than the left headlamp left angle $\theta_{LL}$, the light-shielding area deriving part 34 sets the light-shielding area obtained in the angle range between the left headlamp first angle $\theta_{LW}$ and the left headlamp left angle $\theta_{LL}$ as the actual left headlamp light-shielding area JLSR.

Herein, instead of using the light-shielding area obtained in the angle range between the left headlamp first angle $\theta_{LW}$ and the left headlamp left angle $\theta_{LL}$ as the actual left headlamp light-shielding area JLSR, the light-shielding area deriving part 34 may adopt as the actual left headlamp light-shielding area JLSR the light-shielding area obtained in the angle range between the left headlamp left angle $\theta_{LL}$ and an angle obtained by adding the attachment angle error $\theta_s$ of the front vehicle outside detection part 21 to the left headlamp first angle $\theta_{LW}$.

Herein, the attachment angle error $\theta_s$ of the front vehicle outside detection part 21 may be either positive or negative value, and is set so that the actual left headlamp light-shielding area JLSR is widened. With this configuration, even if the attachment position of the front vehicle outside detection part 21 is shifted, the actual left headlamp light-shielding area JLSR is set to be wide, and therefore glare can be prevented from being given to the preceding vehicle 2.

When the left headlamp first angle $\theta_{LW}$ is positive, and is larger than the left headlamp right angle $\theta_{LR}$ and smaller than the left headlamp left angle $\theta_{LL}$, the light-shielding area deriving part 34 sets the light-shielding area obtained in the angle range between the left headlamp right angle $\theta_{LR}$ and the left headlamp first angle $\theta_{LW}$ as the actual left headlamp light-shielding area JLSR.

Herein, instead of using the light-shielding area obtained in the angle range between the left headlamp right angle $\theta_{LR}$ and the left headlamp unit first angle $\theta_{LW}$ as the actual left headlamp light-shielding area JLSR, the light-shielding area deriving part 34 may adopt as the actual left headlamp light-shielding area JLSR the light-shielding area obtained in the angle range between the left headlamp right angle $\theta_{LR}$ and an angle obtained by adding the attachment angle error $\theta_s$ of the front vehicle outside detection part 21 to the left headlamp unit first angle $\theta_{LW}$.

Herein, the attachment angle error $\theta_s$ of the front vehicle outside detection part 21 may be either positive or negative value, and is set so that the actual left headlamp light-shielding area JLSR is widened. With this configuration, even if the attachment position of the front vehicle outside detection part 21 is shifted, the actual left headlamp light-shielding area JLSR is set to be wide, and therefore glare can be prevented from being given to the preceding vehicle 2.

In addition, when the left headlamp first angle $\theta_{LW}$ is negative and is smaller than the left headlamp right angle $\theta_{LR}$, the light-shielding area deriving part 34 sets the light-shielding area obtained in the angle range between the left headlamp left angle $\theta_{LL}$ and the left headlamp right angle $\theta_{LR}$ as the actual left headlamp light-shielding area JLSR. This can be adopted when the obstacle is not shielded in the left headlamp light-shielding area LSR derived on the basis of the positional relationship between the automobile 1 and the preceding vehicle 2.

In addition, when the left headlamp first angle $\theta_{LW}$ is positive and is larger than the left headlamp left angle $\theta_{LL}$, the light-shielding area deriving part 34 sets the light-shielding area obtained in the angle range between the left headlamp right angle $\theta_{LR}$ and the left headlamp left angle $\theta_{LL}$ as the actual left headlamp light-shielding area JLSR. This can be adopted when the obstacle is not shielded in the left headlamp light-shielding area LSR derived on the basis of the positional relationship between the automobile 1 and the preceding vehicle 2.

The light-shielding area deriving part 34 outputs information indicating an angle range in which the actual left headlamp light-shielding area JLSR is obtained (hereinafter referred to as "actual left headlamp angle range") to the light distribution control part 35.

The light distribution control part 35 acquires information indicating the actual right headlamp angle range output by the light-shielding area deriving part 34, and controls the light irradiation state of the right headlamp 14R of the headlamp part 10 (among the left headlamp 14L, the right headlamp 14R, the left road-surface drawing part 20L, and the right road-surface drawing part 20R) according to the acquired information indicating the actual right headlamp angle range. For example, the light distribution control part 35 sets a light distribution pattern according to the actual right headlamp angle range, and outputs a control signal to the right headlamp 14R so that light is irradiated according to the set light distribution pattern. Herein, the light distribution control part 35 turns off a segment which overlaps with the actual right headlamp angle range even slightly.

In addition, the light distribution control part 35 acquires information indicating the actual left headlamp angle range output by the light-shielding area deriving part 34, and controls the light irradiation state of the left headlamp 14L of the headlamp part 10 (among the left headlamp 14L, the right headlamp 14R, the left road-surface drawing part 20L, and the right road-surface drawing part 20R) in accordance with the acquired information indicating the actual left headlamp angle range. For example, the light distribution control part 35 sets a light distribution pattern according to the actual left headlamp angle range, and outputs a control signal to the left headlamp 14L so that light is irradiated according to the set light distribution pattern. Herein, the light distribution control part 35 turns off a segment that overlaps with the actual left headlamp angle range even slightly.

Specifically, the light distribution control part 35 controls (by image processing, LD control calculation, MEM control calculation, etc.) the irradiation of light by the headlamp part 10 (including the left headlamp 14L, the right headlamp 14R, the left road-surface drawing part 20L, and the right road-surface drawing part 20R), thereby controlling the light distribution of the headlamp part 10 (including the left headlamp 14L, the right headlamp 14R, the left road-surface drawing part 20L, and the right road-surface drawing part 20R).

Herein, the light distribution control part 35 controls, for example, light distribution when the headlamp part 10 (the left headlamp 14L, the right headlamp 14R, the left road-surface drawing part 20L, and the right road-surface drawing part 20R) is lit, or light distribution when the headlamp part 10 (the left headlamp 14L, the right headlamp 14R, the left road-surface drawing part 20L, and the right road-surface drawing part 20R) are flashing.

Figure 7:
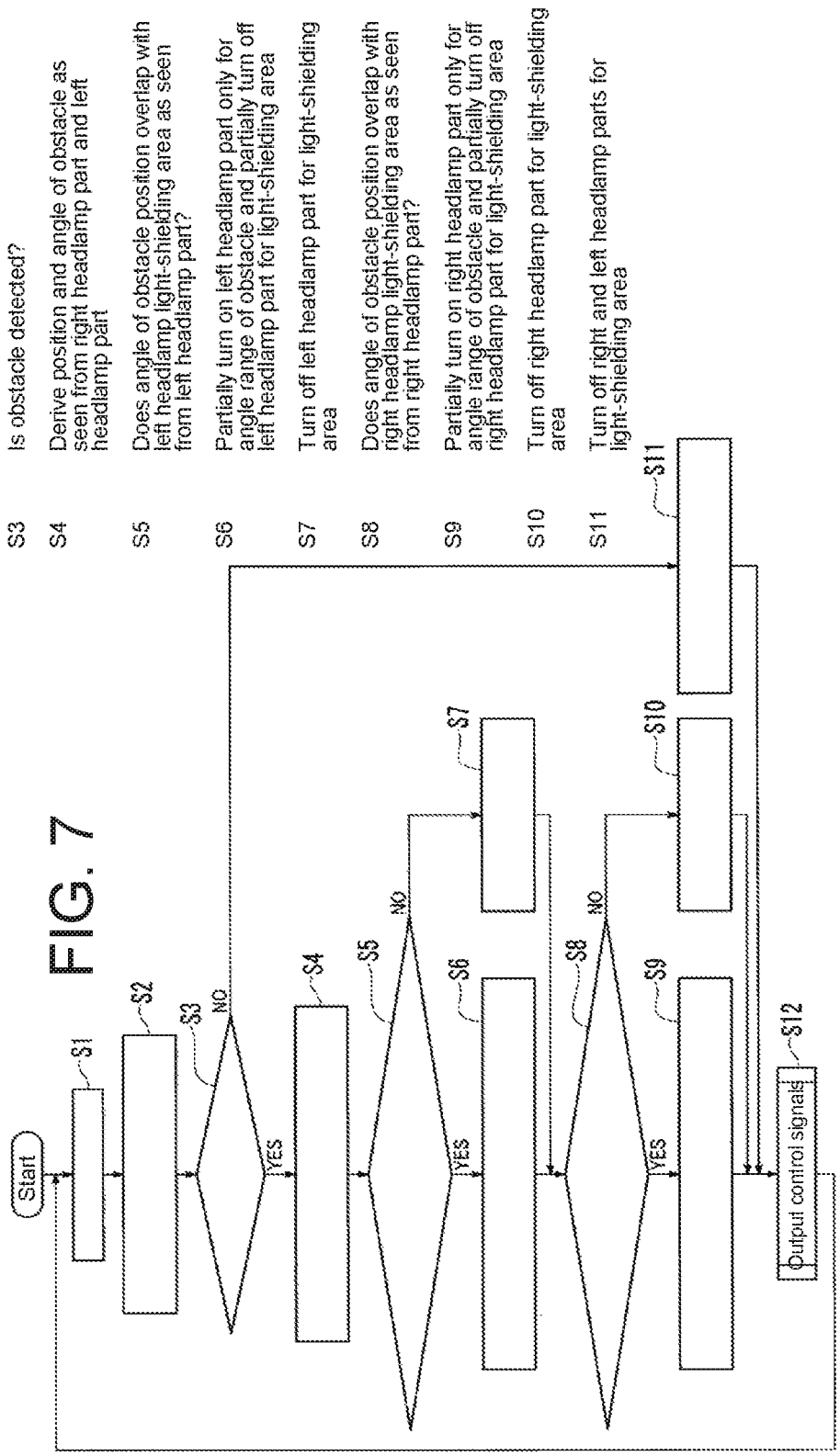
FIG. 7 is a flowchart showing an example of a process of controlling a light-shielding area of a lighting system provided in an automobile according to an exemplary embodiment of the present invention.

Example of procedure for deriving actual right headlamp angle range and actual left headlamp angle range:

FIG. 7 is a flowchart showing an example of a procedure of a process for controlling a light-shielding area of a lighting system provided in an automobile according to an exemplary embodiment of the present invention. Note that the following brief descriptions are the steps performed according to the flow chart:

S1 Detect preceding vehicle
S2 Derive right headlamp light-shielding area and left headlamp light-shielding area
S3 Is obstacle detected?
S4 Derive position and angle of obstacle as seen from right headlamp part and left headlamp part
S5 Does angle of obstacle position overlap with left headlamp light-shielding area as seen from left headlamp part?
S6 Partially turn on left headlamp part only for angle range of obstacle and partially turn off left headlamp part for light-shielding area
S7 Turn off left headlamp part for light-shielding area
S8 Does angle of obstacle position overlap with right headlamp light-shielding area as seen from right headlamp part?
S9 Partially turn on right headlamp part only for angle range of obstacle and partially turn off right headlamp part for light-shielding area
S10 Turn off right headlamp part for light-shielding area
S11 Turn off right and left headlamp parts for light-shielding area
S12 Output control signals In this example, it is assumed that a certain person boards the driver's seat of the automobile 1 as a driver. It is assumed that the automobile 1 detects the preceding vehicle 2, travels while shielding the detected preceding vehicle 2 from light, and reaches a curve.

Step S1:

The vehicle detection part 32 acquires an image in front of the automobile 1 periodically captured by the camera 40, and detects the preceding vehicle 2 on the basis of the acquired image in front of the automobile 1. When detecting the preceding vehicle 2, the vehicle detection part 32 outputs a pair of recognition results on the preceding vehicle 2 to the light-shielding area deriving part 34.

Step S2:

The light-shielding area deriving part 34 obtains the positional relationship between the automobile 1 and the preceding vehicle 2 on the basis of the pair of recognition results on the preceding vehicle 2 output by the vehicle detection part 32, and derives the right headlamp light-shielding area RSR of the right headlamp part 10R and the left headlamp light-shielding area LSR of the left headlamp part 10L on the basis of the obtained positional relationship.

Step S3:

The obstacle detection part 33 acquires an image in front of the automobile 1 periodically captured by the camera 40, and detects an obstacle on the basis of the acquired image in front of the automobile 1. When detecting an obstacle, the vehicle detection part 32 outputs a recognition result of one point on the obstacle (one point on the boundary between the wall WL and a portion other than the wall WL) to the light-shielding area deriving part 34.

Step S4:

When the obstacle detection part 33 detects an obstacle, the light-shielding area deriving part 34 causes the LiDAR 36 to derive the distance between the LiDAR 36 and the left taillamp 11L of the preceding vehicle 2, the distance between the LiDAR 36 and the right taillamp part 11R of the preceding vehicle 2, and the distance between the LiDAR 36 and the wall WL (one point on the border between the wall WL and a portion other than the wall WL).

The light-shielding area deriving part 34 acquires the distance between the LiDAR 36 and the left taillamp part 11L of the preceding vehicle 2, which has been derived by the LiDAR 36, and derives the coordinate ($X_L$, $Y_L$) of the position of the left end portion (in the present exemplary embodiment, the left taillamp part 11L) on the basis of the acquired distance between the LiDAR 36 and the left taillamp part 11L of the preceding vehicle 2.

The light-shielding area deriving part 34 acquires the distance between the LiDAR 36 and the right taillamp part 11R of the preceding vehicle 2, which has been derived by the LiDAR 36, and derives the coordinate ($X_R$, $Y_R$) of the position of the right end portion (in the present exemplary embodiment, the right taillamp part 11R) on the basis of the acquired distance between the LiDAR 36 and the right taillamp part 11R of the preceding vehicle 2.

The light-shielding area deriving part 34 causes the LiDAR 36 to derive the distance between the LiDAR 36 and the wall WL on the basis of the result of recognizing one point on the obstacle outputted by the obstacle detection part 33, i.e., one point on the border between the wall WL and a part other than the wall WL. The light-shielding area deriving part 34 obtains the distance between the LiDAR 36 and the wall WL derived by the LiDAR 36, and derives a point ($X_{WL}$, $Y_{WL}$) on the wall WL on the basis of the obtained distance between the LiDAR 36 and the wall WL.

The light-shielding area deriving part 34 derives the angle (right headlamp first angle $\theta_{RW}$) of the position of the obstacle seen from the right headlamp part 10R by the above-mentioned Equation (3).

The light-shielding area deriving part 34 derives the angle (the left headlamp first angle $\theta_{LW}$) of the position of the obstacle seen from the left headlamp part 10L by the above-mentioned Equation (6).

Step S5:

The light-shielding area deriving part 34 derives the left headlamp left angle $\theta_{LL}$ by Equation (4), and the left headlamp right angle $\theta_{LR}$ by Equation (5).

The light-shielding area deriving part 34 determines whether or not the left headlamp first angle $\theta_{LW}$ is larger than the left headlamp right angle $\theta_{LR}$ and smaller than the left headlamp right angle $\theta_{LL}$ on the basis of the derived left headlamp first angle $\theta_{LW}$ when the left headlamp first angle $\theta_{LW}$ is negative, thereby determining whether or not the left headlamp first angle $\theta_{LW}$ overlaps with the angle range in which the left headlamp light-shielding area LSR of the left headlamp part 10L is obtained.

When the left headlamp first angle $\theta_{LW}$ is negative, and when the left headlamp first angle $\theta_{LW}$ is larger than the left headlamp right angle $\theta_{LR}$ and smaller than the left headlamp right angle $\theta_{LL}$, the light-shielding area deriving part 34 determines that the left headlamp first angle $\theta_{LW}$ overlaps with the angle range in which the left headlamp light-shielding area LSR of the left headlamp part 10L is obtained.

When the left headlamp first angle $\theta_{LW}$ is negative, and when the left headlamp first angle $\theta_{LW}$ is equal to or less than the left headlamp right angle $\theta_{LR}$ or larger than the left headlamp right angle $\theta_{LL}$, the light-shielding area deriving part 34 determines that the left headlamp first angle $\theta_{LW}$ does not overlap with the angle range in which the left headlamp light-shielding area LSR of the left headlamp part 10L is obtained.

In addition, the light-shielding area deriving part 34 determines whether or not the left headlamp first angle $\theta_{LW}$ is larger than the left headlamp right angle $\theta_{LR}$ and smaller than the left headlamp left angle $\theta_{LL}$ when the left headlamp first angle $\theta_{LW}$ is positive on the basis of the derived left headlamp first angle $\theta_{LW}$, thereby determining whether or not the left headlamp first angle $\theta_{LW}$ overlaps with the angle range in which the left headlamp light-shielding area LSR of the left headlamp part 10L is obtained.

When the left headlamp first angle $\theta_{LW}$ is positive, and when the left headlamp first angle $\theta_{LW}$ is larger than the left headlamp right angle $\theta_{LR}$ and smaller than the left headlamp left angle $\theta_{LL}$, the light-shielding area deriving part 34 determines that the left headlamp first angle $\theta_{LW}$ overlaps with the angle range in which the left headlamp light-shielding area LSR of the left headlamp part 10L is obtained.

When the left headlamp first angle $\theta_{LW}$ is positive, and when the left headlamp first angle $\theta_{LW}$ is equal to or less than the left headlamp right angle $\theta_{LR}$ or larger than the left headlamp left angle $\theta_{LL}$, the light-shielding area deriving part 34 determines that the left headlamp first angle $\theta_{LW}$ does not overlap with the angle range in which the left headlamp light-shielding area LSR of the left headlamp part 10L is obtained.

Step S6:

When judging that the left headlamp first angle $\theta_{LW}$ overlaps with the angle range in which the left headlamp light-shielding area LSR of the left headlamp part 10L is obtained, the light-shielding area deriving part 34, when the left headlamp first angle $\theta_{LW}$ is negative, sets the light-shielding area obtained in the angle range between the left headlamp first angle $\theta_{LW}$ and the left headlamp left angle $\theta_{LL}$ as the actual left headlamp light-shielding area JLSR.

When judging that the left headlamp first angle $\theta_{LW}$ overlaps with the angle range in which the left headlamp light-shielding area LSR of the left headlamp part 10L is obtained, the light-shielding area deriving part 34, when the left headlamp first angle $\theta_{LW}$ is positive, sets the light-shielding area obtained in the angle range between the left headlamp right angle $\theta_{LR}$ and the left headlamp first angle $\theta_{LW}$ as the actual left headlamp light-shielding area JLSR.

The light-shielding area deriving part 34 outputs information indicating the actual left headlamp angle range to the light distribution control part 35.

The light distribution control part 35 acquires the information indicating the actual left headlamp angle range output by the light-shielding area deriving part 34, and controls the light irradiation state of the left headlamp 14L of the headlamp part 10 (among the left headlamp 14L, the right headlamp 14R, the left road-surface drawing part 20L, and the right road-surface drawing part 20R) according to the acquired information indicating the actual left headlamp angle range. For example, the light distribution control part 35 sets a light distribution pattern according to the actual left headlamp angle range, and outputs a control signal to the left headlamp 14L so that light is irradiated according to the set light distribution pattern.

Step S7:

When judging that the left headlamp first angle $\theta_{LW}$ does not overlap with the angle range in which the left headlamp light-shielding area LSR of the left headlamp part 10L is obtained, the light-shielding area deriving part 34, when the left headlamp first angle $\theta_{LW}$ is negative and is smaller than the left headlamp right angle $\theta_{LR}$, sets the light-shielding area obtained in the angle range between the left headlamp left angle $\theta_{LL}$ and the left headlamp right angle $\theta_{LR}$ as the actual left headlamp light-shielding area JLSR.

When judging that the left headlamp first angle $\theta_{LW}$ does not overlap with the angle range in which the left headlamp light-shielding area LSR of the left headlamp part 10L is obtained, the light-shielding area deriving part 34, when the left headlamp first angle $\theta_{LW}$ is positive and is larger than the left headlamp left angle $\theta_{LL}$, sets the light-shielding area obtained in the angle range between the left headlamp right angle $\theta_{LR}$ and the left headlamp left angle $\theta_{LL}$ as the actual left headlamp light-shielding area JLSR.

The light-shielding area deriving part 34 outputs information indicating the actual left headlamp angle range to the light distribution control part 35.

The light distribution control part 35 acquires the information indicating the actual left headlamp angle range output by the light-shielding area deriving part 34, and controls the light irradiation state of the left headlamp 14L of the headlamp part 10 (among the left headlamp 14L, the right headlamp 14R, the left road-surface drawing part 20L, and the right road-surface drawing part 20R) according to the acquired information indicating the actual left headlamp angle range. For example, the light distribution control part 35 sets a light distribution pattern according to the actual left headlamp angle range, and outputs a control signal to the left headlamp 14L so that light is irradiated according to the set light distribution pattern.

Step 8:

The light-shielding area deriving part 34 derives the right headlamp left angle $\theta_{RL}$ by Equation (1), and the right headlamp right angle $\theta_{RR}$ by Equation (2).

The light-shielding area deriving part 34 determines whether or not the right headlamp first angle $\theta_{RW}$ is larger than the right headlamp right angle $\theta_{RR}$ and smaller than the right headlamp left angle $\theta_{RL}$ on the basis of the derived right headlamp first angle $\theta_{RW}$ when the right headlamp first angle $\theta_{RW}$ is negative, thereby determining whether or not the right headlamp first angle $\theta_{RW}$ overlaps with the angle range in which the right headlamp light-shielding area RSR of the right headlamp part 10R is obtained.

When the right headlamp first angle $\theta_{RW}$ is negative, and when the right headlamp first angle $\theta_{RW}$ is larger than the right headlamp right angle $\theta_{RR}$ and smaller than the right headlamp left angle $\theta_{RL}$, the light-shielding area deriving part 34 determines that the right headlamp first angle $\theta_{RW}$ overlaps with the angle range in which the right headlamp light-shielding area RSR of the right headlamp part 10R is obtained.

When the right headlamp first angle $\theta_{RW}$ is negative, and when the right headlamp first angle $\theta_{RW}$ is equal to or less than the right headlamp right angle $\theta_{RR}$ or larger than the right headlamp left angle $\theta_{RL}$, the light-shielding area deriving part 34 determines that the right headlamp first angle $\theta_{RW}$ does not overlap with the angle range in which the right headlamp light-shielding area RSR of the right headlamp part 10R is obtained.

In addition, the light-shielding area deriving part 34 determines whether or not the right headlamp first angle $\theta_{RW}$ is larger than the right headlamp right angle $\theta_{RR}$ and smaller than the right headlamp left angle $\theta_{RL}$ when the right headlamp first angle $\theta_{RW}$ is positive on the basis of the derived right headlamp first angle $\theta_{RW}$, thereby determining whether or not the right headlamp first angle $\theta_{RW}$ overlaps with the angle range in which the right headlamp light-shielding area RSR of the right headlamp part 10R is obtained.

When the right headlamp first angle $\theta_{RW}$ is positive, and when the right headlamp first angle $\theta_{RW}$ is larger than the right headlamp right angle $\theta_{RR}$ and smaller than the right headlamp left angle $\theta_{RL}$, the light-shielding area deriving part 34 determines that the right headlamp first angle $\theta_{RW}$ overlaps with the angle range in which the right headlamp light-shielding area RSR of the right headlamp part 10R is obtained.

When the right headlamp first angle $\theta_{RW}$ is positive, and when the right headlamp first angle $\theta_{RW}$ is equal to or less than the right headlamp right angle $\theta_{RR}$ or larger than the right headlamp left angle $\theta_{RL}$, the light-shielding area deriving part 34 determines that the right headlamp first angle $\theta_{RW}$ does not overlap with the angle range in which the right headlamp light-shielding area RSR of the right headlamp part 10R is obtained.

Step S9:

When judging that the right headlamp first angle $\theta_{RW}$ overlaps with the angle range in which the right headlamp light-shielding area RSR of the right headlamp part 10R is obtained, the light-shielding area deriving part 34, when the right headlamp first angle $\theta_{RW}$ is negative, sets the light-shielding area obtained in the angle range between the right headlamp first angle $\theta_{RW}$ and the right headlamp left angle $\theta_{RL}$ as the actual right headlamp light-shielding area JRSR.

When judging that the right headlamp first angle $\theta_{RW}$ overlaps with the angle range in which the right headlamp light-shielding area RSR of the right headlamp part 10R is obtained, the light-shielding area deriving part 34, when the right headlamp first angle $\theta_{RW}$ is positive, sets the light-shielding area obtained in the angle range between the right headlamp right angle $\theta_{RR}$ and the right headlamp first angle $\theta_{RW}$ as the actual right headlamp light-shielding area JRSR.

The light-shielding area deriving part 34 outputs information indicating the actual right headlamp angle range to the light distribution control part 35.

The light distribution control part 35 acquires the information indicating the actual right headlamp angle range output by the light-shielding area deriving part 34, and controls the light irradiation state of the right headlamp 14R of the headlamp part 10 (among the left headlamp 14L, the right headlamp 14R, the left road-surface drawing part 20L, and the right road-surface drawing part 20R) according to the acquired information indicating the actual right headlamp angle range. For example, the light distribution control part 35 sets a light distribution pattern according to the actual right headlamp angle range, and outputs a control signal to the right headlamp 14R so that light is irradiated according to the set light distribution pattern.

Step S10:

When judging that the right headlamp first angle $\theta_{RW}$ does not overlap with the angle range in which the right headlamp light-shielding area RSR of the right headlamp part 10R is obtained, the light-shielding area deriving part 34, when the right headlamp first angle $\theta_{RW}$ is negative and is smaller than the right headlamp right angle $\theta_{RR}$, sets the light-shielding area obtained in the angle range between the right headlamp left angle $\theta_{RL}$ and the right headlamp right angle $\theta_{RR}$ as the actual right headlamp light-shielding area JRSR.

When judging that the right headlamp first angle $\theta_{RW}$ does not overlap with the angle range in which the right headlamp light-shielding area RSR of the right headlamp part 10R is obtained, the light-shielding area deriving part 34, when the right headlamp first angle $\theta_{RW}$ is positive and is larger than the right headlamp left angle $\theta_{RL}$, sets the light-shielding area obtained in the angle range between the right headlamp right angle $\theta_{RR}$ and the right headlamp left angle $\theta_{RL}$ as the actual right headlamp light-shielding area JRSR.

The light-shielding area deriving part 34 outputs information indicating the actual right headlamp angle range to the light distribution control part 35.

The light distribution control part 35 acquires the information indicating the actual right headlamp angle range output by the light-shielding area deriving part 34, and controls the light irradiation state of the right headlamp 14R of the headlamp part 10 (among the left headlamp 14L, the right headlamp 14R, the left road-surface drawing part 20L, and the right road-surface drawing part 20R) according to the acquired information indicating the actual right headlamp angle range. For example, the light distribution control part 35 sets a light distribution pattern according to the actual right headlamp angle range, and outputs a control signal to the right headlamp 14R so that light is irradiated according to the set light distribution pattern.

Step 11:

When the obstacle detection part 33 does not detect an obstacle, the light-shielding area deriving part 34 outputs, to the light distribution control part 35, information indicating an angle range in which the right headlamp light-shielding area RSR of the right headlamp part 10R is obtained and information indicating an angle range in which the left headlamp light-shielding area LSR of the left headlamp part 10L is obtained.

The light distribution control part 35 acquires the information indicating the angle range in which the right headlamp light-shielding area RSR is obtained output from the light-shielding area deriving part 34, and controls the light irradiation state of the right headlamp 14R of the headlamp part 10 (among the left headlamp 14L, the right headlamp 14R, the left road-surface drawing part 20L, and the right road-surface drawing part 20R) according to the acquired information indicating the angle range in which the right headlamp light-shielding area RSR is obtained. For example, the light distribution control part 35 sets a light distribution pattern in accordance with the angle range in which the right headlamp light-shielding area RSR is obtained, and outputs a control signal to the right headlamp 14R so that light is irradiated in accordance with the set light distribution pattern.

The light distribution control part 35 acquires the information indicating the angle range in which the left headlamp light-shielding area LSR is obtained output from the light-shielding area deriving part 34, and controls the light irradiation state of the left headlamp 14L of the headlamp part 10 (among the left headlamp 14L, the right headlamp 14R, the left road-surface drawing part 20L, and the right road-surface drawing part 20R) according to the acquired information indicating the angle range in which the left headlamp light-shielding area LSR is obtained. For example, the light distribution control part 35 sets a light distribution pattern in accordance with the angle range in which the left headlamp light-shielding area LSR is obtained, and outputs a control signal to the left headlamp 14L so that light is irradiated in accordance with the set light distribution pattern.

Step S12:

Either or both of the left headlamp 14L and the right headlamp 14R emit light in accordance with a control signal output from the light distribution control part 35.

In the flow chart shown in FIG. 7, the order of step S5 to S7 and step S8 to S10 may be changed.

In the exemplary embodiment described above, the automobile 1 is provided with the LiDAR 36 as an example of a sensor for measuring distances, but the present invention is not limited to this example. For example, the distance between the objects may be measured by image-processing an image of a space in front of the automobile obtained by the camera 40.

In the exemplary embodiment described above, the case where the front vehicle outside detection part 21 is attached to the indoor mirror of the automobile 1 has been described, but the present invention is not limited to this example. Such a front vehicle outside detection part 21 may be mounted in the automobile 1 at an arbitrary position within a range in which the front vehicle outside detection part 21 can properly functions.

In the exemplary embodiment described above, the case where the vehicle detection part 32 detects the preceding vehicle has been described, but this is not limitative. For example, the present invention can be applied to a case where the vehicle detection part 32 detects an oncoming vehicle or a case where it detects a rear vehicle.

In the exemplary embodiment described above, the case where the obstacle detection part 33 outputs the image of one point of the edge portion on the obstacle to the light-shielding area deriving part 34 as the recognition result of one point on the obstacle has been described, but this is not limitative. For example, the obstacle detection part 33 may output an image of a plurality of points of the edge portion on the obstacle to the light-shielding area deriving part 34 as a set of recognition results on the obstacle. In this instance, the light-shielding area deriving part 34 causes the LiDAR 36 to derive distances between the LiDAR 36 and points of the wall WL (a plurality of points on the border between the wall WL and a part other than the wall WL), for example. The light-shielding area deriving part 34 may use a result of statistical processing such as averaging the distances between the LiDAR 36 and the plurality of points of the wall WL.

In the exemplary embodiment described above, as an example, the case where the automobile 1 that has detected the preceding vehicle 2 has approached the right curve has been described, but the present invention is not limited to this example. For example, the present invention can be applied to a case where an automobile 1 that has detected the preceding vehicle 2 is approaching the left curve, a case where the automobile 1 is moving straight.

According to the lighting system 101 according to the exemplary embodiment described above, the lighting control device controls the light distribution state by the vehicular headlamp. The lighting control device includes: an obstacle detection part that detects an obstacle from images in front of the subject vehicle taken by a camera 40; a light-shielding area deriving part that drives, when the obstacle detection part detects an obstacle, an actual left headlamp light-shielding area JLSR of a left headlamp 14L attached to the front left side of the subject vehicle, and an actual right headlamp light-shielding area JRSR of a right headlamp 14R attached to the front right side of the subject vehicle, according to the position of the obstacle; and a light distribution control part that controls the light distribution states of the right headlamp 14R and the left headlamp 14L in accordance with the actual left headlamp light-shielding area JLSR and the actual right headlamp light-shielding area JRSR derived by the light-shielding area deriving part. Here, the actual left headlamp light-shielding area JLSR differs from the actual left headlamp light-shielding area JLSR.

With such a configuration, the lighting control device can continue to shield the preceding vehicle from light when no obstacle is detected by controlling the light distribution state by, for example, ADB or the like. If an obstacle is detected, when the position of the obstacle overlaps with the light-shielding area, the lighting control device can perform turn on/off control of the vehicular headlamp so that the overlapping region is irradiated with light while the non-overlapping area is still shielded from light in accordance with the position of the obstacle. By irradiating an area that does not need to be shielded, visibility can be ensured for the driver. In addition, even if the obstacle is shielded from light, it is possible to reduce a sense of discomfort given to the driver.

FIG. 8 is a diagram showing an effect of the lighting system provided in an automobile according to an exemplary embodiment of the present invention. In the example illustrated in FIG. 8, a case is shown in which the automobile 1 has detected the preceding vehicle 2 and is approaching a curve while shielding the preceding vehicle 2 from light. An obstacle (not shown) such as a guard rail is installed inside the curve.

In FIG. 8, (a) shows a conventional light-shielding area. In this case, the automobile 1 may shield the preceding vehicle 2, which is the object to be shielded from light, from light even when it cannot be continuously detected. If the preceding vehicle 2 is not detected but assumed to be detected, the automobile 1 may shield the obstacle between the preceding vehicle 2 and the subject automobile 1 from light. In this case, the driver of the automobile 1 may recognize as if there are a plurality of light-shielding areas, or erroneously recognize the preceding vehicle 2, thereby giving a sense of discomfort.

In FIG. 8, (b) shows a light-shielding area according to the present exemplary embodiment. In the lighting system 101 according to the present exemplary embodiment, when it is determined that the obstacle is unintentionally shielded, unnecessary light shielding is prevented by irradiating the area, in which the obstacle is supposed to be present, with light. In other words, in the angle range toward the light-shielding object within the light distribution range of each of the left and right vehicular headlamps, irradiation of light is performed in the angle range in which an obstacle (such as a guard rail, a cliff, or a wall of a building) exists between the vehicular headlamp and the light-shielding object (such as a preceding vehicle or an oncoming vehicle), and light-shielding is performed in the angle range in which an obstacle does not exist between the vehicular headlamp and the light-shielding object. With this configuration, it is possible to secure visibility for the driver of the automobile 1 and to reduce the sense of discomfort to the driver.

The followings are some configuration examples:

In a certain configuration example, there is provided a lighting control device configured to control a light distribution state by a vehicular headlamp, the lighting control device comprising: an obstacle detection part configured to detect an obstacle from an image taken by a camera in front of a subject vehicle; a light-shielding area deriving part configured to derive a first light-shielding area (actual left headlamp light-shielding area JLSR) of a left headlamp attached to the front left side of the vehicle, and a second light-shielding area (actual right headlamp light-shielding area JRSR) of a right headlamp attached to the front right side of the vehicle in accordance with a position of the obstacle when the obstacle detection part detects the obstacle; and a light distribution control part configured to control a light distribution state of the right headlamp and the left headlamp according to the first light-shielding area and the second light-shielding area derived by the light-shielding area deriving part, wherein the first light-shielding area and the second light-shielding area are different from each other.

In a certain configuration example, when a counterclockwise direction is assumed as a positive angle with reference to the traveling direction of the subject vehicle, the light-shielding area deriving part derives a left headlamp left angle (in the exemplary embodiment, the left headlamp left angle $\theta_{LL}$) formed by the traveling direction of the subject vehicle and a line connecting the left headlamp and the left end of a preceding vehicle, a left headlamp right angle (in the exemplary embodiment, the left headlamp right angle $\theta_{LR}$) formed by the traveling direction of the subject vehicle and a line connecting the left headlamp and the right end of the preceding vehicle, and a left headlamp first angle (in the exemplary embodiment, the left headlamp first angle $\theta_{LW}$) formed by the traveling direction of the subject vehicle and a line connecting the left headlamp and the obstacle, and derives the first light-shielding area on the basis of the left headlamp left angle, the left headlamp right angle, and the left headlamp first angle.

In a certain configuration example, the light-shielding area deriving part sets, when the left headlamp first angle is negative and is greater than the left headlamp right angle and less than the left headlamp left angle, a light-shielding area obtained in an angle range between the left headlamp first angle and the left headlamp left angle as the first light-shielding area, and sets, when the left headlamp first angle is positive and is greater than the left headlamp right angle and less than the left headlamp left angle, a light-shielding area obtained in an angle range between the left headlamp right angle and the left headlamp first angle as the first light-shielding area.

In a certain configuration example, the light-shielding area deriving part sets, when the left headlamp first angle is negative and is less than the left headlamp right angle, a light-shielding area obtained in an angle range between the left headlamp left angle and the left headlamp right angle as the first light-shielding area, and sets, when the left headlamp first angle is positive and is greater than the left headlamp left angle, a light-shielding area obtained in an angle range between the left headlamp right angle and the left headlamp left angle as the first light-shielding area.

In a certain configuration example, when a counterclockwise direction is assumed as a positive angle with reference to the traveling direction of the subject vehicle, the light-shielding area deriving part derives a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and derives the second light-shielding area on the basis of the right headlamp left angle, the right headlamp right angle, and the right headlamp first angle.

In a certain configuration example, the light-shielding area deriving part sets, when the right headlamp first angle is negative and is greater than the right headlamp right angle and less than the right headlamp left angle, a light-shielding area obtained in an angle range between the right headlamp first angle and the right headlamp left angle as the second light-shielding area, and sets, when the right headlamp first angle is positive and is greater than the right headlamp right angle and less than the right headlamp left angle, a light-shielding area obtained in an angle range between the right headlamp right angle and the right headlamp first angle as the second light-shielding area.

As a certain configuration example, the light-shielding area deriving part sets, when the right headlamp first angle is negative and is less than the right headlamp right angle, a light-shielding area obtained in an angle range between the right headlamp left angle and the right headlamp right angle as the second light-shielding area, and sets, when the right headlamp first angle is positive and is greater than the right headlamp left angle, a light-shielding area obtained in an angle range between the right headlamp right angle and the right headlamp left angle as the second light-shielding area.

As a certain configuration example, there is provided a vehicular lamp comprising: a vehicular headlamp; and a lighting control device configured to control a light distribution state formed by the vehicular headlamp, wherein the lighting control device comprises: an obstacle detection part configured to detect an obstacle from an image in front of a subject vehicle taken by a camera; a light-shielding area deriving part configured to derive a first light-shielding area of a left headlamp attached to a front left side of the vehicle, and a second light-shielding area of a right headlamp attached to a front right side of the vehicle according to a position of the obstacle when the obstacle detection part detects the obstacle; and a light distribution control part configured to control a light distribution state of the right headlamp and a light distribution state of the left headlamp according to the first light-shielding area and the second light-shielding area derived by the light-shielding area deriving part, in which the first light-shielding area and the second light-shielding area are different from each other.

As a certain configuration example, there is provided a vehicular lamp comprising: a vehicular headlamp; and a lighting control device configured to control a light distribution state formed by the vehicular headlamp, wherein light is irradiated in an angle range in which an obstacle exists between the vehicular headlamp and a to-be-shielded object among angle ranges of the vehicular headlamp toward the to-be-shielded object within a light distribution range of the vehicular headlamp, and light is shielded in an angle range in which an obstacle does not exist between the vehicular headlamp and the to-be-shielded object.

The aforementioned processing may be performed by recording a program for realizing the functions of the device (e.g., the control part 31) according to the exemplary embodiment described above on a computer-readable recording medium, and causing the computer system to read and execute the program recorded on the recording medium.

The "computer system" herein may include an operating system (OS: Operating System) or hardware such as peripheral equipment.

The "computer-readable recording medium" refers to a rewritable nonvolatile memory such as a flexible disk, a magneto-optical disk, a ROM (Read Only Memory), a flash memory, or the like, a portable medium such as a DVD (Digital Versatile Disc), or a storage device such as a hard disk incorporated in a computer system.

Further, the "computer-readable recording medium" includes a medium that holds a program for a predetermined period of time, such as a volatile memory (e.g., a DRAM (Dynamic Random Access Memory)) in a computer system serving as a server or a client when the program is transmitted via a network such as the Internet or a communication line such as a telephone line.

The program may be transmitted from a computer system storing the program in a storage device or the like to another computer system via a transmission medium or by a transmission wave in the transmission medium. Here, the "transmission medium" for transmitting the program refers to a medium having a function of transmitting information, such as a network (communication network) such as the Internet or a communication line (communication line) such as a telephone line.

The above-mentioned program may be a program for realizing a part of the above-mentioned functions. Further, the above-mentioned program may be a so-called difference file (difference program) capable of realizing the above-mentioned functions in combination with a program already recorded in the computer system.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting control device configured to control a light distribution state by a vehicular headlamp, the lighting control device comprising:
processing circuitry configured to
  detect an obstacle from an image in front of a subject vehicle taken by a camera;
  derive a first light-shielding area of a left headlamp attached to a front left side of the vehicle, and a second light-shielding area of a right headlamp attached to a front right side of the vehicle according to a position of the obstacle in response to the obstacle being detected; and
  control a light distribution state of the right headlamp and a light distribution state of the left headlamp according to the derived first light-shielding area and the derived second light-shielding area, wherein
the first light-shielding area and the second light-shielding area are different from each other,
when a counterclockwise direction is assumed as a positive angle with reference to the traveling direction of the subject vehicle, the processing circuitry is configured to
  derive a left headlamp left angle formed by the traveling direction of the subject vehicle and a line connecting the left headlamp and the left end of a preceding vehicle, a left headlamp right angle formed by the traveling direction of the subject vehicle and a line connecting the left headlamp and the right end of the preceding vehicle, and a left headlamp first angle formed by the traveling direction of the subject vehicle and a line connecting the left headlamp and the obstacle, and
  derive the first light-shielding area on the basis of the left headlamp left angle, the left headlamp right angle, and the left headlamp first angle, and the processing circuitry is configured to
  set, when the left headlamp first angle is negative and is greater than the left headlamp right angle and less than the left headlamp left angle, a light-shielding area obtained in an angle range between the left headlamp first angle and the left headlamp left angle as the first light-shielding area, and
  set, when the left headlamp first angle is positive and is greater than the left headlamp right angle and less than the left headlamp left angle, a light-shielding area obtained in an angle range between the left headlamp right angle and the left headlamp first angle as the first light-shielding area.

2. The lighting control device according to claim 1, wherein
the processing circuitry is configured to:
set, when the left headlamp first angle is negative and is less than the left headlamp right angle, a light-shielding area obtained in an angle range between the left headlamp left angle and the left headlamp right angle as the first light-shielding area, and
set, when the left headlamp first angle is positive and is greater than the left headlamp left angle, a light-shielding area obtained in an angle range between the left headlamp right angle and the left headlamp left angle as the first light-shielding area.

3. The lighting control device according to claim 1, wherein
when a counterclockwise direction is assumed as a positive angle with reference to the traveling direction of the subject vehicle, the processing circuitry is configured to
derive a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and
derive the second light-shielding area on the basis of the right headlamp left angle, the right headlamp right angle, and the right headlamp first angle.

4. The lighting control device according to claim 3, wherein the processing circuitry is configured to
set, when the right headlamp first angle is negative and is greater than the right headlamp right angle and less than the right headlamp left angle, a light-shielding area obtained in an angle range between the right headlamp first angle and the right headlamp left angle as the second light-shielding area, and
set, when the right headlamp first angle is positive and is greater than the right headlamp right angle and less than the right headlamp left angle, a light-shielding area obtained in an angle range between the right headlamp right angle and the right headlamp first angle as the second light-shielding area.

5. A lighting control device configured to control a light distribution state by a vehicular headlamp, the lighting control device comprising:
processing circuitry configured to
detect an obstacle from an image in front of a subject vehicle taken by a camera;
derive a first light-shielding area of a left headlamp attached to a front left side of the vehicle, and a second light-shielding area of a right headlamp attached to a front right side of the vehicle according to a position of the obstacle in response to the obstacle being detected; and
control a light distribution state of the right headlamp and a light distribution state of the left headlamp according to the derived first light-shielding area and the derived second light-shielding area, wherein
the first light-shielding area and the second light-shielding area are different from each other, when a counterclockwise direction is assumed as a positive angle with reference to the traveling direction of the subject vehicle, the processing circuitry is configured to
derive a left headlamp left angle formed by the traveling direction of the subject vehicle and a line connecting the left headlamp and the left end of a preceding vehicle, a left headlamp right angle formed by the traveling direction of the subject vehicle and a line connecting the left headlamp and the right end of the preceding vehicle, and a left headlamp first angle formed by the traveling direction of the subject vehicle and a line connecting the left headlamp and the obstacle, and
derive the first light-shielding area on the basis of the left headlamp left angle, the left headlamp right angle, and the left headlamp first angle, and
the processing circuitry is configured to
set, when the left headlamp first angle is negative and is less than the left headlamp right angle, a light-shielding area obtained in an angle range between the left headlamp left angle and the left headlamp right angle as the first light-shielding area, and
set, when the left headlamp first angle is positive and is greater than the left headlamp left angle, a light-shielding area obtained in an angle range between the left headlamp right angle and the left headlamp left angle as the first light-shielding area.

6. The lighting control device according to claim 5, wherein
when a counterclockwise direction is assumed as a positive angle with reference to the traveling direction of the subject vehicle, the processing circuitry is configured to
derive a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and
derive derives the second light-shielding area on the basis of the right headlamp left angle, the right headlamp right angle, and the right headlamp first angle.

7. The lighting control device according to claim 6, wherein the processing circuitry is configured to
set, when the right headlamp first angle is negative and is greater than the right headlamp right angle and less than the right headlamp left angle, a light-shielding area obtained in an angle range between the right headlamp first angle and the right headlamp left angle as the second light-shielding area, and
set, when the right headlamp first angle is positive and is greater than the right headlamp right angle and less than the right headlamp left angle, a light-shielding area obtained in an angle range between the right headlamp right angle and the right headlamp first angle as the second light-shielding area.

8. A lighting control device configured to control a light distribution state by a vehicular headlamp, the lighting control device comprising:
processing circuitry configured to detect an obstacle from an image in front of a subject vehicle taken by a camera;

derive a first light-shielding area of a left headlamp attached to a front left side of the vehicle, and a second light-shielding area of a right headlamp attached to a front right side of the vehicle according to a position of the obstacle in response to the obstacle being detected; and control a light distribution state of the right headlamp and a light distribution state of the left headlamp according to the derived first light-shielding area and the derived second light-shielding area, wherein the first light-shielding area and the second light-shielding area are different from each other, when a counterclockwise direction is assumed as a positive angle with reference to the traveling direction of the subject vehicle, the processing circuitry is configured to derive a left headlamp left angle formed by the traveling direction of the subject vehicle and a line connecting the left headlamp and the left end of a preceding vehicle, a left headlamp right angle formed by the traveling direction of the subject vehicle and a line connecting the left headlamp and the right end of the preceding vehicle, and a left headlamp first angle formed by the traveling direction of the subject vehicle and a line connecting the left headlamp and the obstacle, and derive the first light-shielding area on the basis of the left headlamp left angle, the left headlamp right angle, and the left headlamp first angle, and when a counterclockwise direction is assumed as a positive angle with reference to the traveling direction of the subject vehicle, the processing circuitry is configured to derive a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and derive the second light-shielding area on the basis of the right headlamp left angle, the right headlamp right angle, and the right headlamp first angle.

9. The lighting control device according to claim 8, wherein the processing circuitry is configured to set, when the right headlamp first angle is negative and is greater than the right headlamp right angle and less than the right headlamp left angle, a light-shielding area obtained in an angle range between the right headlamp first angle and the right headlamp left angle as the second light-shielding area, and set, when the right headlamp first angle is positive and is greater than the right headlamp right angle and less than the right headlamp left angle, a light-shielding area obtained in an angle range between the right headlamp right angle and the right headlamp first angle as the second light-shielding area.

10. A lighting control device configured to control a light distribution state by a vehicular headlamp, the lighting control device comprising:

processing circuitry configured to detect an obstacle from an image in front of a subject vehicle taken by a camera;

derive a first light-shielding area of a left headlamp attached to a front left side of the vehicle, and a second light-shielding area of a right headlamp attached to a front right side of the vehicle according to a position of the obstacle in response to the obstacle being detected; and control a light distribution state of the right headlamp and a light distribution state of the left headlamp according to the derived first light-shielding area and the derived second light-shielding area, wherein the first light-shielding area and the second light-shielding area are different from each other, when a counterclockwise direction is assumed as a positive angle with reference to the traveling direction of the subject vehicle, the processing circuitry is configured to derive a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and derive the second light-shielding area on the basis of the right headlamp left angle, the right headlamp right angle, and the right headlamp first angle, and the processing circuitry is configured to set, when the right headlamp first angle is negative and is greater than the right headlamp right angle and less than the right headlamp left angle, a light-shielding area obtained in an angle range between the right headlamp first angle and the right headlamp left angle as the second light-shielding area, and set, when the right headlamp first angle is positive and is greater than the right headlamp right angle and less than the right headlamp left angle, a light-shielding area obtained in an angle range between the right headlamp right angle and the right headlamp first angle as the second light-shielding area.

11. The lighting control device according to claim 10, wherein the processing circuitry is configured to set, when the right headlamp first angle is negative and is less than the right headlamp right angle, a light-shielding area obtained in an angle range between the right headlamp left angle and the right headlamp right angle as the second light-shielding area, and set, when the right headlamp first angle is positive and is greater than the right headlamp left angle, a light-shielding area obtained in an angle range between the right headlamp right angle and the right headlamp left angle as the second light-shielding area.

12. A lighting control device configured to control a light distribution state by a vehicular headlamp, the lighting control device comprising:

processing circuitry configured to detect an obstacle from an image in front of a subject vehicle taken by a camera;

derive a first light-shielding area of a left headlamp attached to a front left side of the vehicle, and a second light-shielding area of a right headlamp attached to a front right side of the vehicle according to a position of the obstacle in response to the obstacle being detected; and control a light distribution state of the right headlamp and a light distribution state of the left headlamp according to the derived first light-shielding area and the derived second light-shielding area, wherein the first light-shielding area and the second light-shielding area are different from each other, when a counterclockwise direction is assumed as a positive angle with reference to the traveling direction of the subject vehicle, the processing circuitry is configured to derive a right headlamp left angle formed by the traveling direction of the subject vehicle and a line connecting the right headlamp and the left end of a preceding vehicle, a right headlamp right angle formed by the traveling direction of the subject vehicle and a line connecting the right headlamp and the right end of the preceding vehicle, and a right headlamp first angle formed by the traveling direction of the subject vehicle and a line connecting the right headlamp and the obstacle, and derive the second light-shielding area on the basis of the right headlamp left angle, the right headlamp right angle, and the right headlamp first angle, and the processing circuitry is configured to set, when the right headlamp first angle is negative and is less than the right headlamp right angle, a light-shielding area obtained in an angle range between the right headlamp left angle and the right headlamp right angle as the second light-shielding area, and set, when the right headlamp first angle is positive and is greater than the right headlamp left angle, a light-shielding area obtained in an angle range between the right headlamp right angle and the right headlamp left angle as the second light-shielding area.

* * * * *